US011879282B2

(12) United States Patent
Baker et al.

(10) Patent No.: US 11,879,282 B2
(45) Date of Patent: Jan. 23, 2024

(54) WINDOW BALANCE ASSEMBLY

(71) Applicant: Caldwell Manufacturing Company North America, LLC, Rochester, NY (US)

(72) Inventors: Mark R. Baker, Rochester, NY (US); Wilbur James Kellum, III, Hilton, NY (US)

(73) Assignee: ASSA ABLOY Fenestration, LLC, Rochester, NY (US)

( * ) Notice: Subject to any disclaimer, the term of this patent is extended or adjusted under 35 U.S.C. 154(b) by 0 days.

(21) Appl. No.: 18/121,290

(22) Filed: Mar. 14, 2023

(65) Prior Publication Data

US 2023/0287719 A1 Sep. 14, 2023

Related U.S. Application Data

(63) Continuation of application No. 17/472,257, filed on Sep. 10, 2021, now Pat. No. 11,624,225, which is a (Continued)

(51) Int. Cl.

| | |
|---|---|
| ***E05D 13/00*** | (2006.01) |
| ***E05D 15/22*** | (2006.01) |
| ***E05D 15/16*** | (2006.01) |
| ***E05F 13/00*** | (2006.01) |
| ***E06B 3/44*** | (2006.01) |

(52) U.S. Cl.

CPC ......... *E05D 13/1276* (2013.01); *E05D 13/00* (2013.01); *E05D 13/1207* (2013.01); *E05D 15/16* (2013.01); *E05D 15/165* (2013.01); *E05D 15/22* (2013.01); *E05F 13/00* (2013.01); *E06B 3/4415* (2013.01); *E05D 13/12* (2013.01); *E05F 2700/00* (2013.01); *E05Y 2201/482* (2013.01); *E05Y 2600/41* (2013.01);

(Continued)

(58) Field of Classification Search

CPC ..... E05D 13/00; E05D 13/12; E05D 13/1207; E05D 13/1276; E05D 15/16; E05D 15/165; E05D 15/22; E05F 13/00; E05F 2700/00; E06B 3/4415

USPC .................................................... 16/193, 197

See application file for complete search history.

(56) References Cited

U.S. PATENT DOCUMENTS

| | | | |
|---|---|---|---|
| 887,968 | A | 5/1908 | Selkirk |
| 2,602,958 | A | 7/1952 | Brown |

(Continued)

FOREIGN PATENT DOCUMENTS

| | | | |
|---|---|---|---|
| GB | 2278626 | A | 12/1994 |

OTHER PUBLICATIONS

International Search Report, Written Opinion and International Preliminary Report on Patentability (with 37 sheets of annexes) for PCT/US2011/024134; ISA/US.

(Continued)

*Primary Examiner* — Roberta S Delisle

(74) *Attorney, Agent, or Firm* — Harness, Dickey & Pierce, P.L.C.

(57) ABSTRACT

A window balance assembly may include a carrier, a spring element, and a mounting bracket. The spring element may include first and second portions. The first portion may be coupled to the carrier. The mounting bracket may engage the second portion of the spring element and may selectively engage the carrier.

12 Claims, 15 Drawing Sheets

Related U.S. Application Data continuation of application No. 16/918,076, filed on Jul. 1, 2020, now Pat. No. 11,613,920, which is a continuation of application No. 16/004,595, filed on Jun. 11, 2018, now Pat. No. 10,704,308, which is a continuation of application No. 15/331,951, filed on Oct. 24, 2016, now Pat. No. 9,995,072, which is a continuation of application No. 14/838,807, filed on Aug. 28, 2015, now Pat. No. 9,476,242, which is a continuation of application No. 14/336,192, filed on Jul. 21, 2014, now Pat. No. 9,121,209, which is a continuation of application No. 14/043,051, filed on Oct. 1, 2013, now Pat. No. 8,813,310, which is a continuation of application No. 13/576,440, filed as application No. PCT/US2011/024134 on Feb. 9, 2011, now Pat. No. 8,561,260.

(60) Provisional application No. 61/302,715, filed on Feb. 9, 2010, provisional application No. 61/302,722, filed on Feb. 9, 2010.

(52) U.S. Cl.
CPC ....... *E05Y 2600/45* (2013.01); *E05Y 2800/10* (2013.01); *E05Y 2900/148* (2013.01)

(56) References Cited

U.S. PATENT DOCUMENTS

| | | | |
|---|---|---|---|
| 3,364,622 | A | 1/1968 | Collard |
| 4,300,316 | A | 11/1981 | Ficurilli |
| 4,570,382 | A | 2/1986 | Suess |
| 4,642,845 | A | 2/1987 | Marshik |
| 4,785,581 | A | 11/1988 | Abramson et al. |
| 4,953,258 | A | 9/1990 | Mennuto |
| 4,958,462 | A | 9/1990 | Cross |
| 5,036,621 | A | 8/1991 | Iwasaki |
| 5,127,192 | A | 7/1992 | Cross |
| 5,353,548 | A | 10/1994 | Westfall |
| 5,463,793 | A | 11/1995 | Westfall |
| 5,566,507 | A | 10/1996 | Schmidt et al. |
| 5,661,927 | A | 9/1997 | Polowinczak et al. |
| 5,699,636 | A | 12/1997 | Stark |
| 5,806,243 | A | 9/1998 | Prete et al. |
| 5,852,854 | A | 12/1998 | Pierrot et al. |
| 6,041,476 | A | 3/2000 | deNormand |
| 6,119,398 | A | 9/2000 | Yates, Jr. |
| 6,305,126 | B1 | 10/2001 | Hendrickson et al. |
| 6,679,000 | B2 | 1/2004 | Uken et al. |
| 6,763,550 | B2 | 7/2004 | Regnier |
| 6,820,368 | B2 | 11/2004 | Uken et al. |
| 6,857,228 | B2 | 2/2005 | Kunz et al. |
| 6,860,066 | B2 | 3/2005 | Kunz et al. |
| 6,931,788 | B2 | 8/2005 | Uken et al. |
| 6,990,710 | B2 | 1/2006 | Kunz et al. |
| 7,191,562 | B2 | 3/2007 | Uken et al. |
| 7,735,191 | B2 * | 6/2010 | Tuller ................ E05D 13/1276 16/193 |
| 8,074,402 | B2 | 12/2011 | Tuller |
| 8,561,260 | B2 | 10/2013 | Baker et al. |
| 8,813,310 | B2 | 8/2014 | Baker et al. |
| 8,819,896 | B2 | 9/2014 | Kellum, III et al. |
| 8,918,979 | B2 | 12/2014 | Baker |
| 8,966,822 | B2 | 3/2015 | Sofianek et al. |
| 9,003,710 | B2 | 4/2015 | Kellum, III et al. |
| 9,121,209 | B2 | 9/2015 | Baker et al. |
| 9,181,748 | B2 | 11/2015 | Sofianek et al. |
| 9,458,655 | B2 | 10/2016 | deNormand |
| 9,988,834 | B2 | 6/2018 | Sofianek et al. |
| 10,053,899 | B2 | 8/2018 | deNormand et al. |
| 10,081,972 | B1 * | 9/2018 | Kunz ........................ E05D 5/02 |
| 10,208,517 | B2 | 2/2019 | Lucci et al. |
| 10,563,441 | B2 * | 2/2020 | Kellum, III ......... E05D 13/1292 |
| 11,352,821 | B2 | 6/2022 | Kellum |
| 2004/0006845 | A1 | 1/2004 | Polowinczak et al. |
| 2004/0163209 | A1 | 8/2004 | Pettit |
| 2004/0244158 | A1 | 12/2004 | Awakura et al. |
| 2005/0198775 | A1 | 9/2005 | Pettit et al. |
| 2006/0086052 | A1 | 4/2006 | Petta et al. |
| 2006/0207185 | A1 | 9/2006 | Shuler et al. |
| 2007/0101654 | A1 | 5/2007 | Robertson |
| 2008/0047099 | A1 | 2/2008 | Malek |
| 2008/0120804 | A1 | 5/2008 | Annes et al. |
| 2008/0178424 | A1 | 7/2008 | Tuller |
| 2008/0178425 | A1 | 7/2008 | Tuller |
| 2009/0002602 | A1 | 1/2009 | Fimbel, III et al. |
| 2011/0239402 | A1 | 10/2011 | Steen et al. |
| 2014/0208653 | A1 | 7/2014 | Sofianek et al. |

OTHER PUBLICATIONS

U.S. Appl. No. 17/472,257, filed Sep. 10, 2021.

* cited by examiner

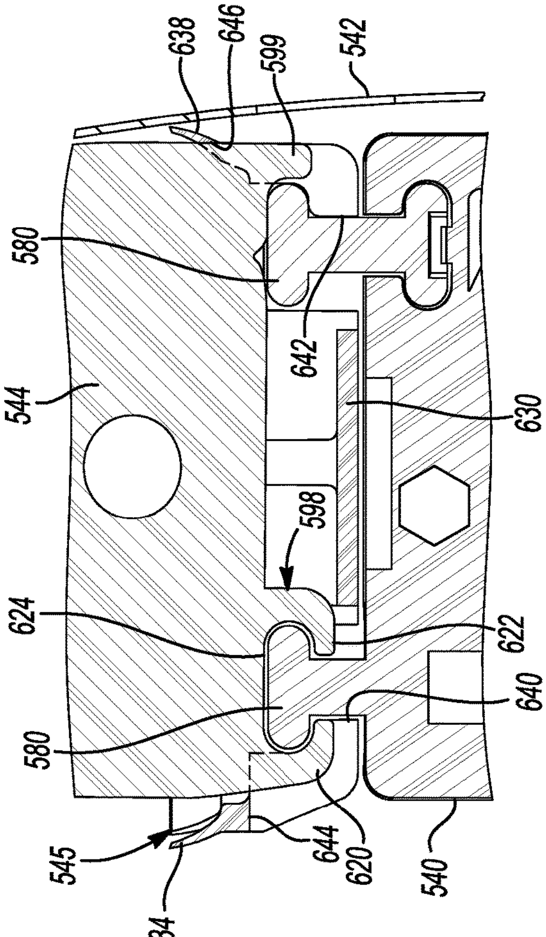
Fig-16
Fig-15
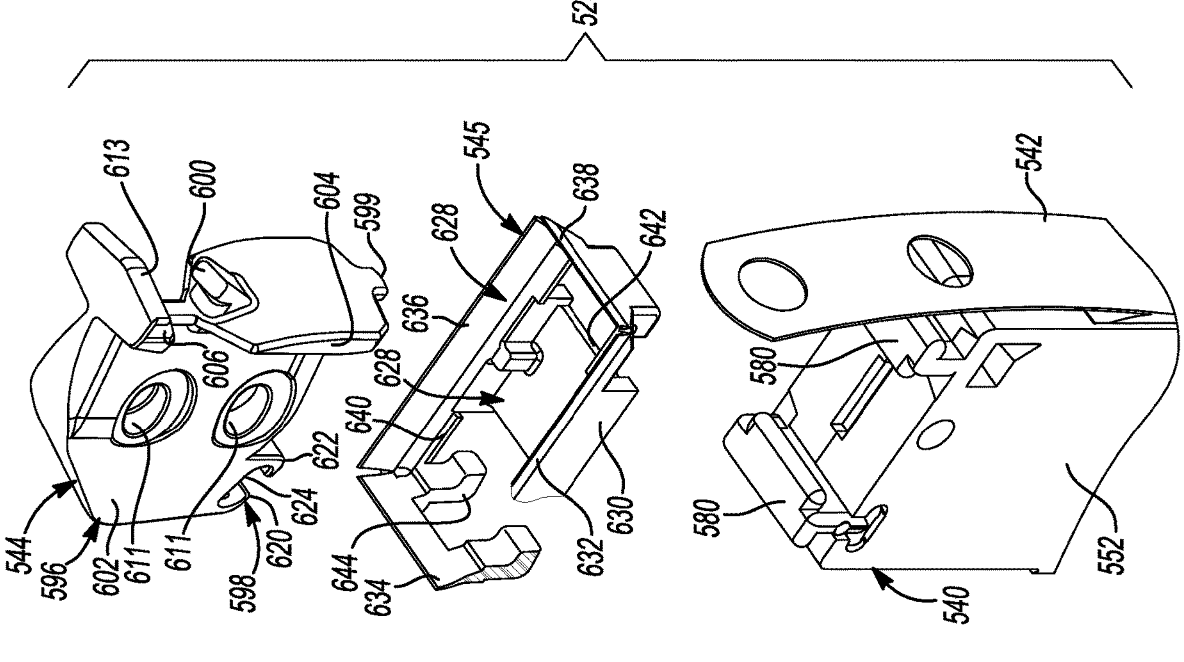

WINDOW BALANCE ASSEMBLY

CROSS-REFERENCE TO RELATED APPLICATIONS

This application is a continuation of U.S. patent application Ser. No. 17/472,257, filed Sep. 10, 2021; which is a continuation of U.S. patent application Ser. No. 16/918,076, filed Jul. 1, 2020; which is a continuation of U.S. patent application Ser. No. 16/004,595, filed Jun. 11, 2018 to issue as U.S. Pat. No. 10,704,308 on Jul. 7, 2020; which is a continuation of U.S. patent application Ser. No. 15/331,951, filed Oct. 24, 2016 issued as U.S. Pat. No. 9,995,072 on Jun. 12, 2018; which is a continuation of U.S. patent application Ser. No. 14/838,807 filed Aug. 28, 2015 issued as U.S. Pat. No. 9,476,242 on Oct. 25, 2016; which is a continuation of U.S. patent application Ser. No. 14/336,192 filed Jul. 21, 2014 issued as U.S. Pat. No. 9,121,209 on Sep. 1, 2015; which is a continuation of U.S. patent application Ser. No. 14/043,051 filed on Oct. 1, 2013 issued as U.S. Pat. No. 8,813,310 on Aug. 26, 2014; which is a continuation of U.S. patent application Ser. No. 13/576,440 filed on Aug. 1, 2012 issued as U.S. Pat. No. 8,561,260 on Oct. 22, 2013; which is a National Stage of International Application No. PCT/US2011/024134, filed on Feb. 9, 2011; which claims the benefit of U.S. Provisional Application No. 61/302,715, filed on Feb. 9, 2010 and U.S. Provisional Application No. 61/302,722, filed on Feb. 9, 2010. The entire disclosures of each of the above applications are incorporated herein by reference.

FIELD

The present disclosure relates to window balance assemblies, and more particularly to a mounting bracket and carrier assembly including a curl spring.

BACKGROUND

This section provides background information related to the present disclosure and is not necessarily prior art.

Modern window assemblies in residential, commercial and industrial buildings may include one or more window sashes that are movable within a window jamb. Window sashes that move vertically to open and close often include two or more window balance assemblies. The balance assemblies urge the window sash upward (i.e., toward an open position for a lower sash or toward a closed position for an upper sash) to assist a user in moving the window sash and to retain the window sash at a position selected by the user.

SUMMARY

This section provides a general summary of the disclosure, and is not a comprehensive disclosure of its full scope or all of its features.

In one form, the present disclosure provides a window balance assembly for installation in a window assembly. The window balance assembly may include a carrier, a spring element, and a mounting bracket. The spring element may include first and second portions. The first portion may be coupled to the carrier. The mounting bracket may engage the second portion of the spring element and may selectively engage the carrier. The mounting bracket may include a first mounting surface disposed at a non-perpendicular angle relative to an exterior surface of carrier when the window balance assembly is in a uninstalled or shipping configuration. The first mounting surface may be substantially parallel to the exterior surface of the carrier when the window balance assembly is in an installed configuration and the mounting bracket is disengaged from the carrier.

In another form, the present disclosure provides a window balance assembly that may include a carrier, a spring element, and a mounting bracket. The spring element may include first and second portions. The first portion may be coupled to the carrier. The mounting bracket may include a spring engagement feature and a stress riser. The spring engagement feature may engage the second portion of the spring element. The stress riser may couple the mounting bracket to the carrier and may fail in response to application of a force to disengage the mounting bracket from the carrier. Failure of the stress riser may include breaking, fracturing, elastic or plastic deformation of the stress riser to allow the mounting bracket to permanently or temporarily disengage the carrier.

In yet another form, the present disclosure provides a window balance assembly that may include a carrier, a spring element and a mounting bracket. The spring element may include first and second portions. The first portion may be coupled to the carrier. The mounting bracket may include a body portion and a breakaway portion. The body portion may engage the second portion of the spring element. The breakaway portion may engage the carrier and the body portion when the window balance assembly is in an uninstalled or shipping configuration and may disengage the body portion when the window balance assembly is moved into an installed configuration.

In yet another form, the present disclosure provides a window balance assembly that is movable between an uninstalled configuration and an installed configuration. The window balance assembly may include a carrier, a spring element and a mounting bracket. The spring element may include first and second portions. The first portion may be coupled to the carrier. The second portion may be coupled to the mounting bracket. The mounting bracket may be coupled to the carrier by a stress riser in the uninstalled configuration. The stress riser may fail in response to application of a force to disengage the mounting bracket from the carrier.

The window balance assembly may be sold and/or shipped to a window manufacturer, window installation contractor, or an end user in the uninstalled or shipping configuration as a unitary assembly. Shipping the assembly in this configuration prevents the installer from having to assemble and align the various components of the balance assembly, thereby preventing the balance assembly from being assembled or aligned incorrectly. Furthermore, shipping window balance assemblies in this manner reduced the number of individual components that a builder, contractor or installer has to manage and keep track of.

Disengagement between the mounting bracket and carrier may include a material failure (e.g., a break, fracture, plastic deformation or deflection, or an elastic deformation of deflection) of a breakaway tab or stress riser in response to application of a force during installation of the balance assembly. Therefore, inadvertent disengagement of the mounting bracket from the carrier due to mishandling and/or vibrational forces during transit may be reduced or prevented. Preventing or reducing inadvertent disengagement of disassembly of the window balance assembly may reduce costs for window manufacturers and installers by reducing the likelihood that one or more components of the window balance assembly will be lost, damaged or misaligned.

In yet another form, the present disclosure provides a window balance assembly that may include first and second members, a spring element, and a debris dam. The first and second members may be configured to engage a window sash and a window jamb, respectively. The spring element may include first and second portions coupled to the first and second members, respectively. The spring element may bias the window sash, e.g., upward relative to a window sill. The debris dam may be movable with the first member and may be disposed between the second member and at least a portion of the first member. The debris dam may reduce exposure of at least one of the spring element and the first member to debris.

In still another form, the present disclosure provides a window balance assembly for installation in a window assembly including a window jamb and a window sash. The window assembly may include a first wall having a vertically extending slot adjacent the window sash, second and third opposing walls that are substantially perpendicular to the first wall, and a fourth wall opposite the first wall. The first, second, third and fourth walls may define a channel in which the window balance assembly may be installed. The window balance assembly may include a spring element, a carrier, and mounting bracket. The spring element may include first and second portions. The carrier may be coupled to the first portion of the spring element and may be adapted to engage the window sash for movement therewith. The mounting bracket may include a body portion coupled to the second portion of the spring element and may be adapted to be mounted within the channel of the window jamb such that the entire body portion or substantially all of the mounting bracket may be disposed between the second wall and the slot. In this manner, the mounting bracket may remain relatively concealed from view when installed in the window assembly, thereby improving the aesthetics of the window assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 15 is a partially exploded perspective view of the window balance assembly of FIG. 14;

FIG. 16 is a partial cross-sectional view of the window balance assembly of FIG. 14;

Corresponding reference numerals indicate corresponding parts throughout the several views of the drawings.

DETAILED DESCRIPTION

Figure 1:
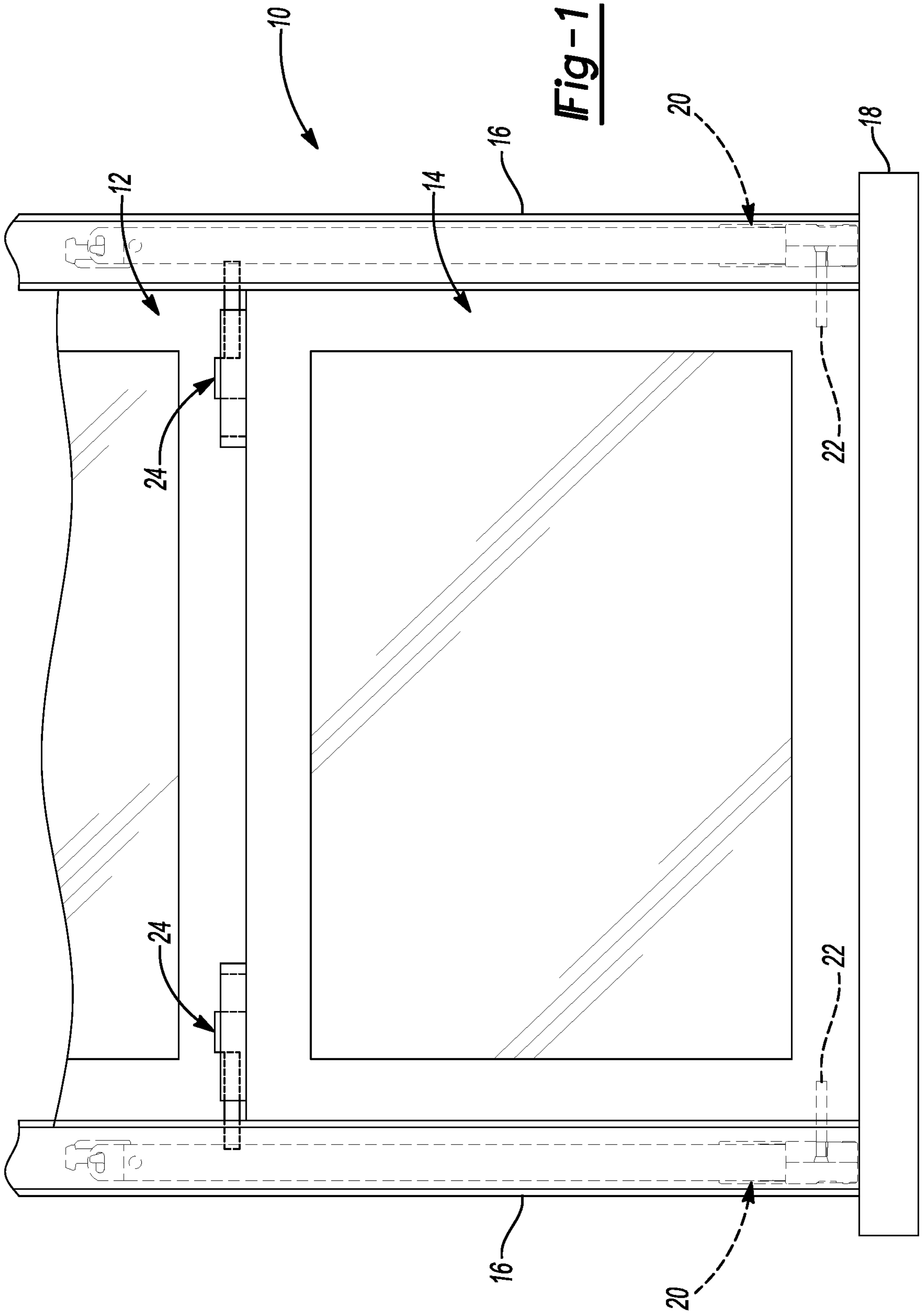
FIG. 1 is a front view of a window assembly including window balance assemblies according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-9, a window assembly 10 is provided that may include an upper sash 12, a lower sash 14, a pair of window jambs 16, a window sill 18, and two or more window balance assemblies or cartridges 20. In the particular embodiment illustrated in FIG. 1, the upper sash 12 is fixed relative to the window sill 18 (i.e., in a single hung window assembly). However, in some embodiments, the upper sash 12 may be movable relative to the window sill 18 between a raised or closed position and a lowered or open position (i.e., in a double hung window assembly). The lower sash 14 may be raised and lowered between open and closed positions and may be connected to the window balance assemblies 20 which assist a user in opening the lower sash 14 and maintain the lower sash 14 in a desired position relative to the window sill 18.

The lower sash 14 may include a pair of pivot bars 22 and a pair of tilt latch mechanisms 24. The pivot bars 22 may extend laterally outward in opposing directions from a lower portion of the lower sash 14 and may engage corresponding ones of the window balance assemblies 20, as will be subsequently described. The tilt latch mechanisms 24 may extend laterally outward in opposing directions from an upper portion of the lower sash 14 and may selectively engage corresponding ones of the window jambs 16. The tilt latch mechanisms 24 may be selectively actuated to allow the lower sash 12 to pivot about the pivot bars 22 relative to the window jambs 16 to facilitate cleaning of an exterior side of the window assembly 10, for example.

It will be appreciated that in a double hung window assembly, the upper sash 12 may also be connected to two or more window balance assemblies to assist the user in opening the upper sash 12 and maintaining the upper sash 12 in a selected position relative to the window sill 18. In such a window assembly, the upper sash 12 may also include tilt latches and pivot bars to allow the upper sash 12 to pivot relative to the window jambs 16 in the manner described above.

Figure 6:
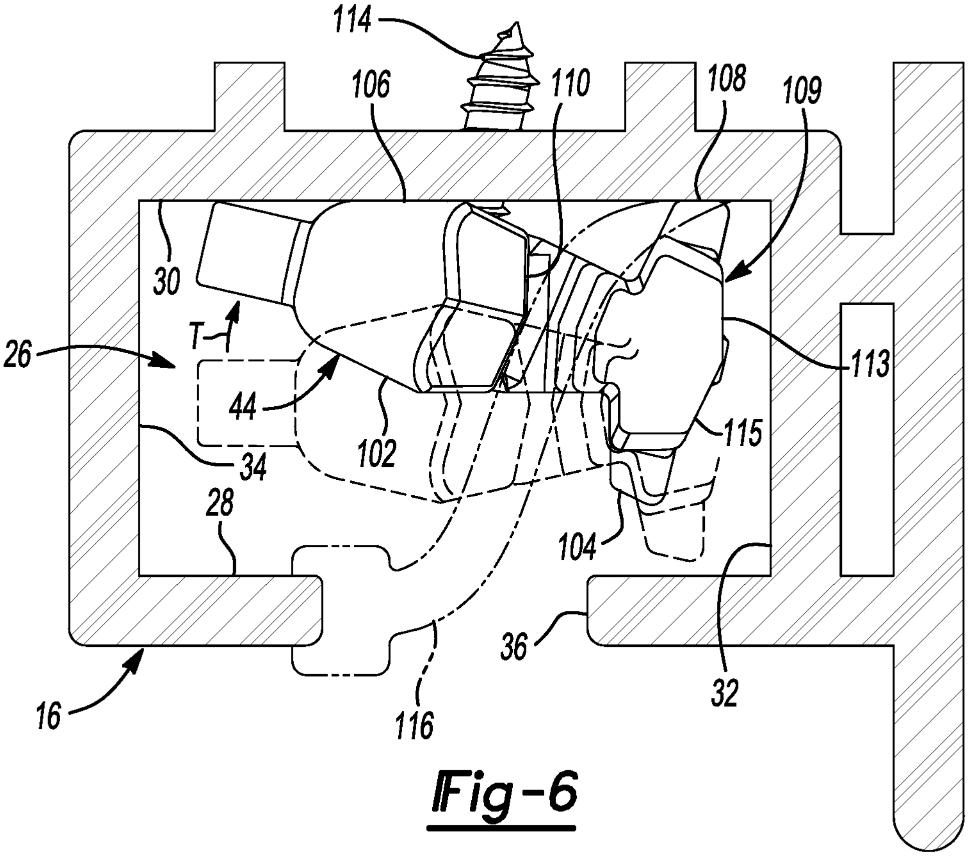
FIG. 6 is a cross-sectional view of a window jamb and the mounting bracket of the window balance assembly of FIG. 2.
Figure 7:
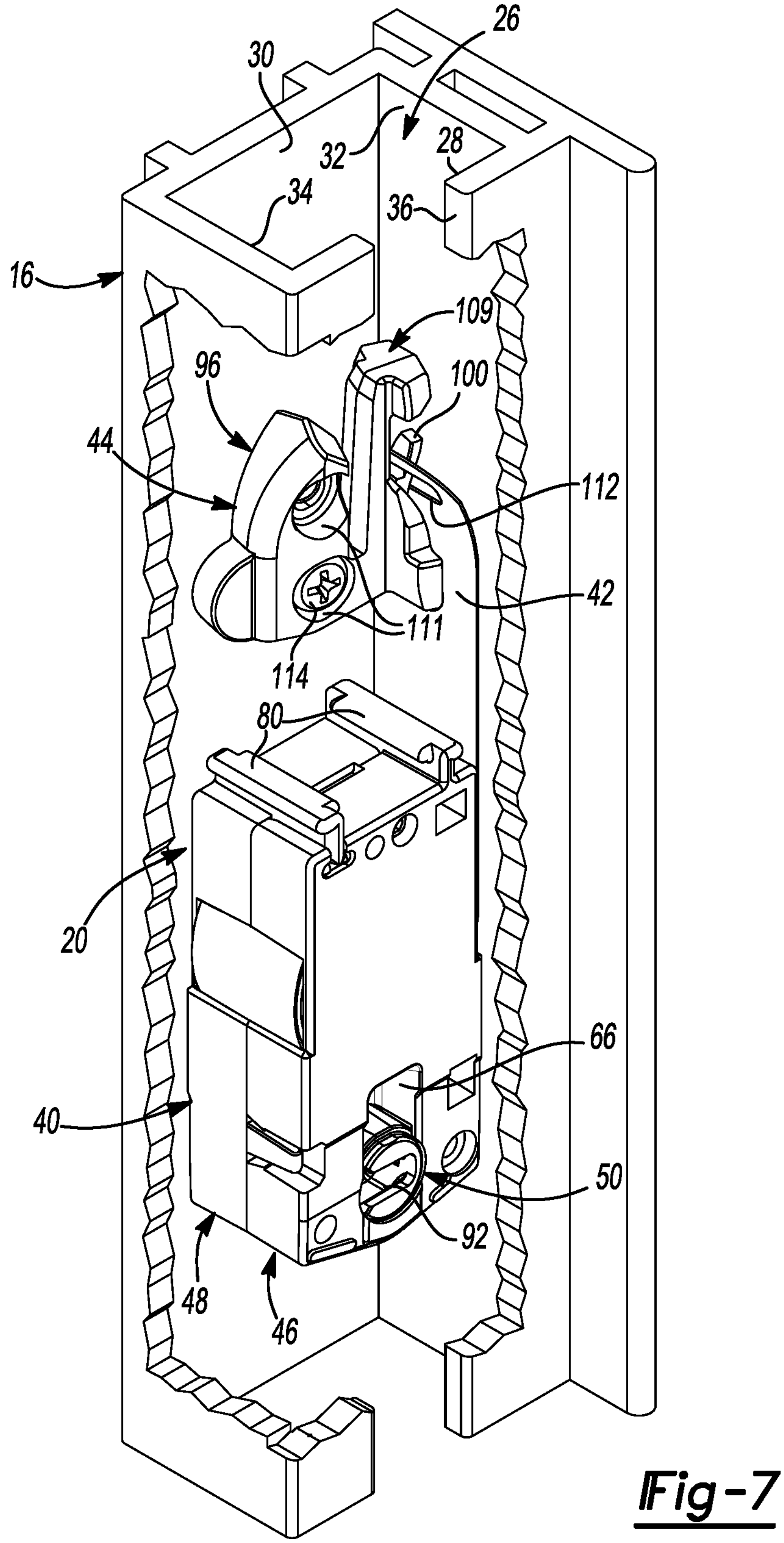
FIG. 7 is a partially cut-away perspective view of the window balance assembly installed in a window jamb according to the principles of the present disclosure.

Each of the window jambs 16 may include a jamb channel 26 defined by a first wall 28, a second wall 30 opposite the first wall 28, and third and fourth walls 32, 34 disposed perpendicular to the first and second walls 28, 30 (FIGS. 6 and 7). The first wall 28 may include a vertically extending slot 36 adjacent the lower sash 14. The window balance assembly 20 may be installed within the jamb channel 26. The pivot bar 22 may extend through the slot 36 and into the jamb channel 26 to engage the window balance assembly 20. The tilt latch mechanism 24 may also selectively engage the slot 36 to lock the lower sash 14 in an upright position (FIG. 1).

Each of the window balance assemblies 20 may include a carrier 40, a curl spring 42, and a mounting bracket 44. The window balance assemblies 20 may be initially assembled and shipped in an uninstalled or shipping configuration (shown in FIGS. 2 and 4) and may be subsequently installed onto the window assembly 10 and placed in an installed configuration (shown in FIGS. 7-9) by a window manufacturer, a construction or renovation contractor, or a homeowner, for example.

The carrier 40 (also referred to as a shoe) may engage the lower sash 14 and house a curled portion 45 of the curl spring 42. The mounting bracket 44 may engage an uncurled end portion 47 of the curl spring 42 and may be fixed relative to the window jamb 16, as shown in FIG. 7. The curl spring 42 may resist being uncurled such that the curl spring 42 exerts an upward force on the carrier 40, thereby biasing the lower sash 14 toward the open position.

The carrier 40 may include a first housing portion 46, a second housing portion 48, and a receiver 50. The first and second housing portions 46, 48 may be identical components that fit together to form a housing for the curl spring 42 and the receiver 50. Forming the first and second housing portions 46, 48 as identical components can reduce the total number of different individual components that must be manufactured and facilitate poka-yoke assembly of the carrier 40. That is, assembly of the carrier 40 is simplified in that a worker need not be concerned with selecting the correct one of each of a pair of different mating components to assemble together.

Each of the first and second housing portions 46, 48 may include an exterior face 52, an interior face 54, a top end 56, a bottom end 58, a first side 60, and a second side 62. An aperture 64 disposed proximate the bottom end 58 may extend through the exterior and interior faces 52, 54 and may rotatably engage the receiver 50. An arcuate recess 65 formed in the interior face 54 may be concentric with the aperture 64 and may partially surround the aperture 64. A first slot 66 in communication with the aperture 64 may be formed in the exterior face 52 and may extend vertically upward (relative to the view shown in FIG. 4) from the aperture 64.

A barbed protuberance 68 may be disposed at or proximate to the first side 60 and may extend outward from the interior face 54. A second slot 70 may be formed in the second side 62 generally opposite the barbed protuberance 68 such that when the first and second housing portions 46, 48 are assembled together, the barbed protuberances 68 may engage the second slots 70 (shown best in FIG. 2). The length of the barbed protuberance 68 may be sufficient to allow the first and second housing portions 46, 48 to move relative to each other between a first position (FIG. 8) and a second position (FIG. 9) without disengaging each other, as will be subsequently described.

The interior face 54 may include generally cylindrical recesses 72. When the first and second housing portions 46, 48 are assembled together, the cylindrical recesses 72 cooperate with each other to form a nest that receives the curled portion 45 of the curl spring 42. Openings 76 in communication with the recess 72 may be formed in the first and second ends 60, 62 through which the uncurled portion 47 of the curl spring 42 may extend toward the mounting bracket 44.

The first and second housing portions 46, 48 may also include a projection 80 and a third slot 82 disposed at the top end 56. The projection 80 may extend from the exterior face 52 beyond the interior face 54 and may include a generally I-shaped cross-section having upper and lower flanges 84, 86. The third slots 82 may be sized and shaped to enable the third slots 82 of the first housing portion 46 and the second housing portion 48 to slidably engage the lower flanges 86 of the second housing portion 48 and the first housing portion 46, respectively. In a similar manner, pegs 88 and apertures 90 formed in the interior face 54 of the first and second housing portions 46, 48 may be sized and positioned to slidably engage each other when the first and second housing portions 46, 48 are assembled together.

The receiver 50 may be a generally cylindrical member including slotted recesses 92 formed in each end thereof and an annular cam 94 extending around a portion of the perimeter of the receiver 50. One of the recesses 92 of each of the window balance assemblies 20 may receive a corresponding one of the pivot bars 22 extending from the lower sash 14. As described above, the receiver 50 may be rotatable within the aperture 64 to allow the lower sash 14 to pivot about the pivot bar 22 between an upright position and a tilted position. The angular span of the cam 94 may correspond to the angular span of the arcuate recess 65 that partially surrounds the aperture 64 in the first and second housing portions 46, 48 such that when the lower sash 14 is in the upright position, the cam 94 fits within the arcuate recess 65.

Figure 2:
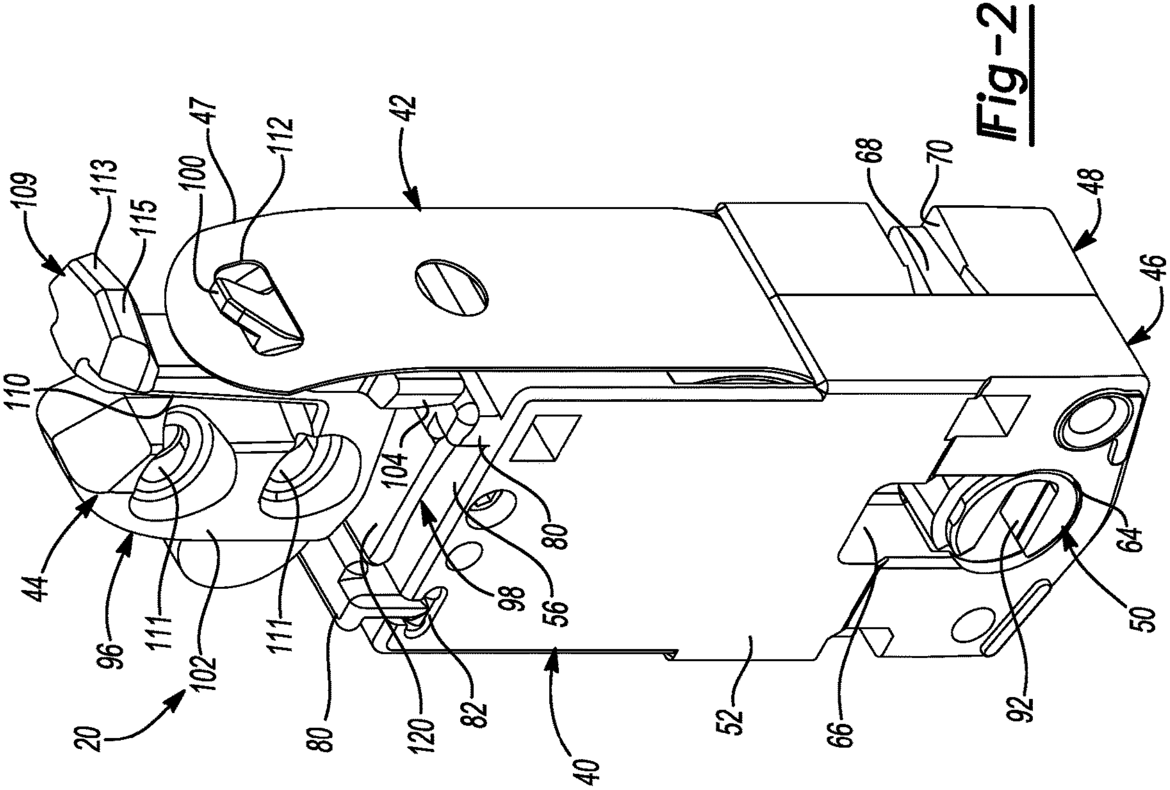
FIG. 2 is a perspective view of a window balance assembly in an uninstalled configuration according to the principles of the present disclosure.
Figure 3:
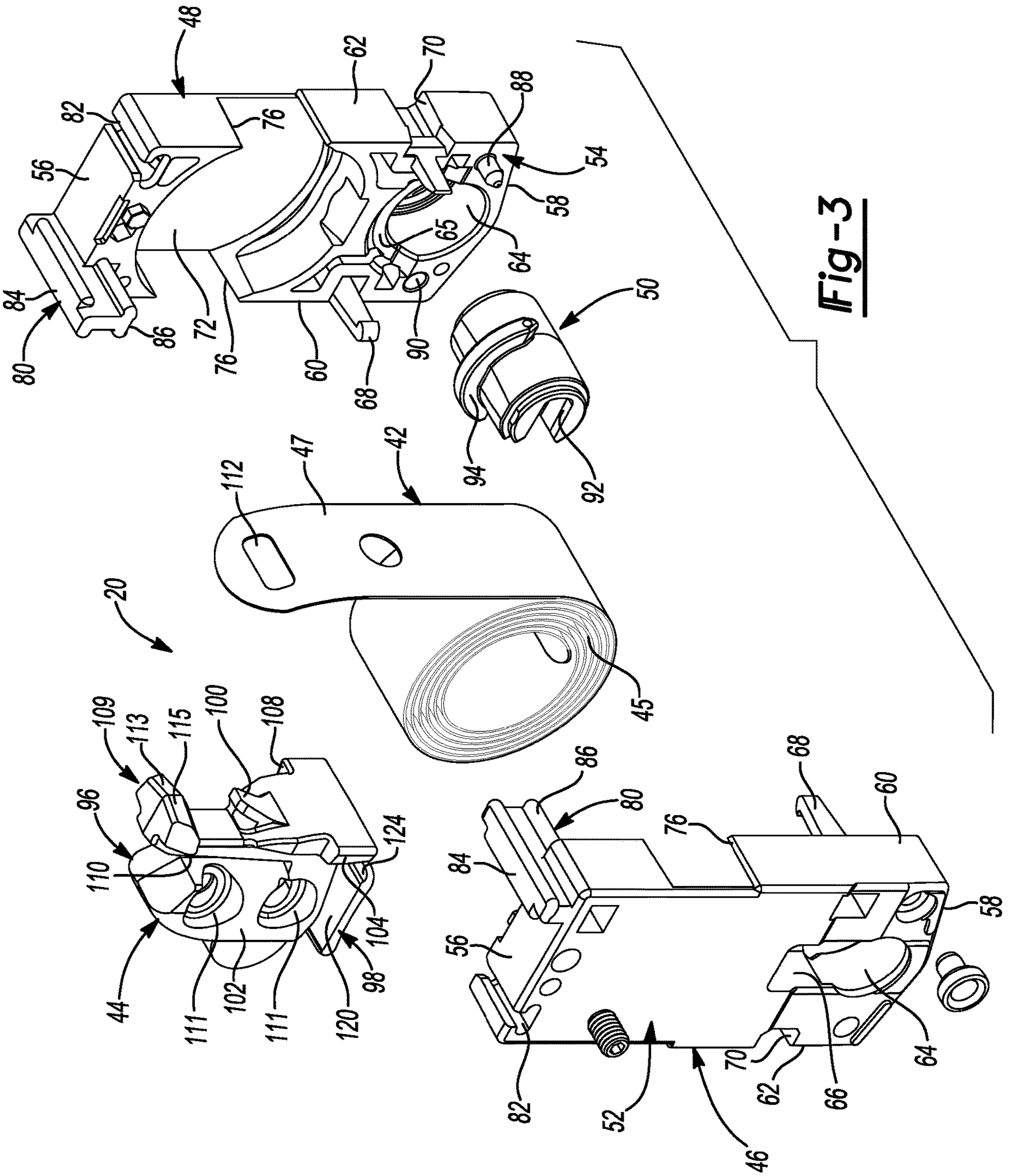
FIG. 3 is an exploded perspective view of the window balance assembly of FIG. 2.
Figure 5:
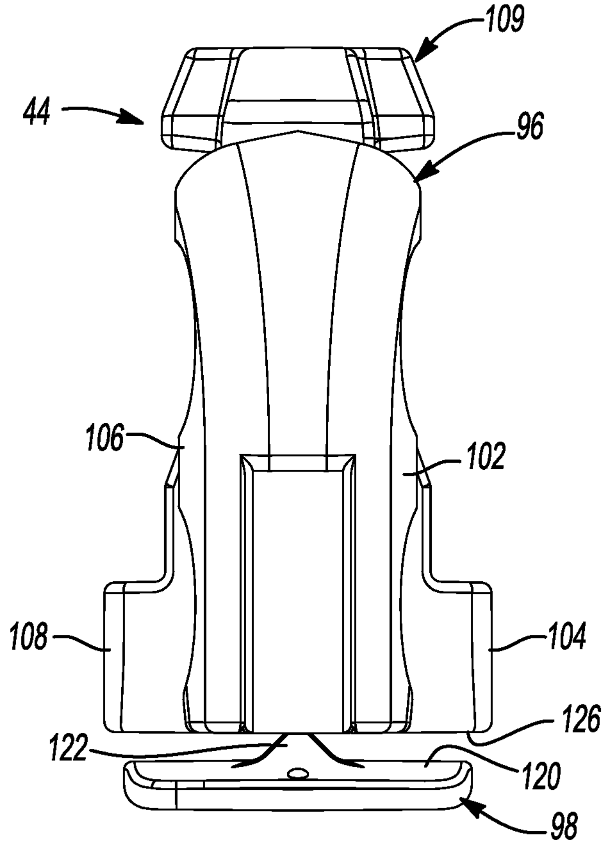
FIG. 5 is a side view of a mounting bracket of the window balance assembly of FIG. 2.
Figure 8:
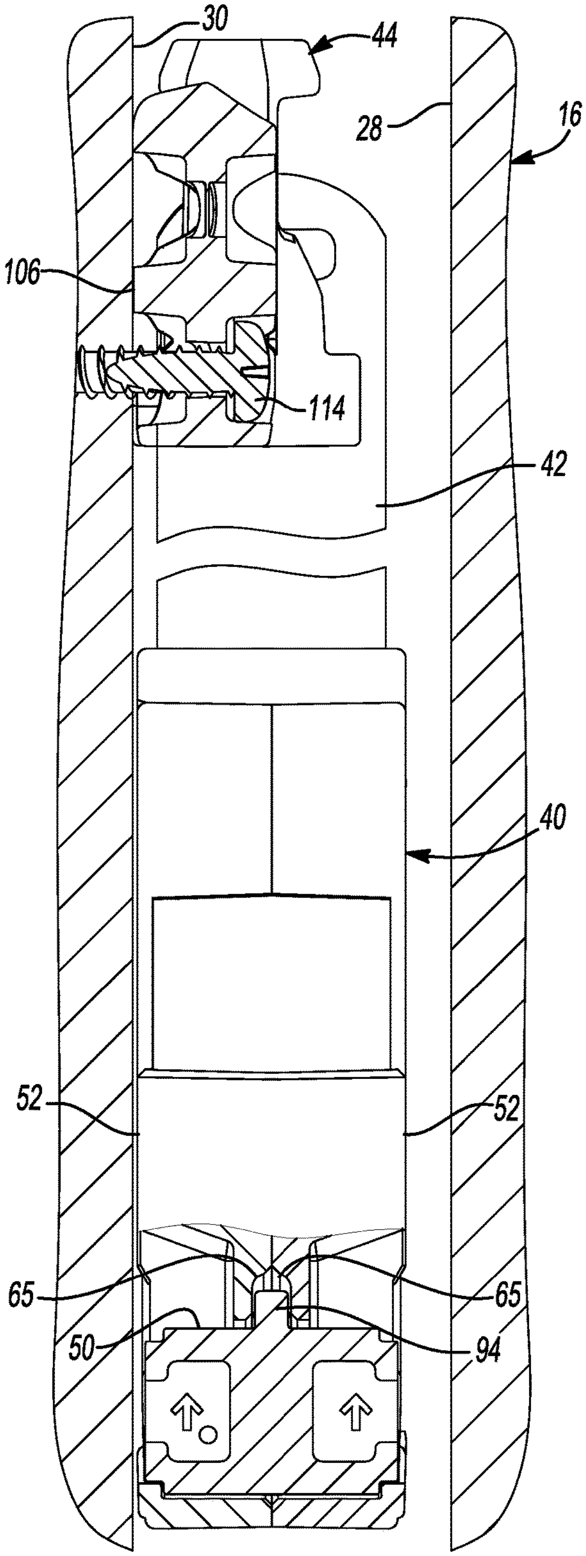
FIG. 8 is a side view of the window balance assembly in a first position according to the principles of the present disclosure.

When the receiver 50 is oriented such that the slotted recess 92 is oriented horizontally relative to the carrier 40, the cam 94 may be fully received within the arcuate recess 65 (see FIGS. 2 and 8). When the cam 94 is received in the arcuate recess 65, the first and second housing portions 46, 48 are allowed to fully close together, as shown in FIG. 8. In this configuration, the carrier 40 is in an unlocked or unrestricted position, such that the carrier 40 may be generally unrestricted from moving upward and downward in the window jamb 16 as the lower sash 14 moves between the open and closed positions.

Figure 4:
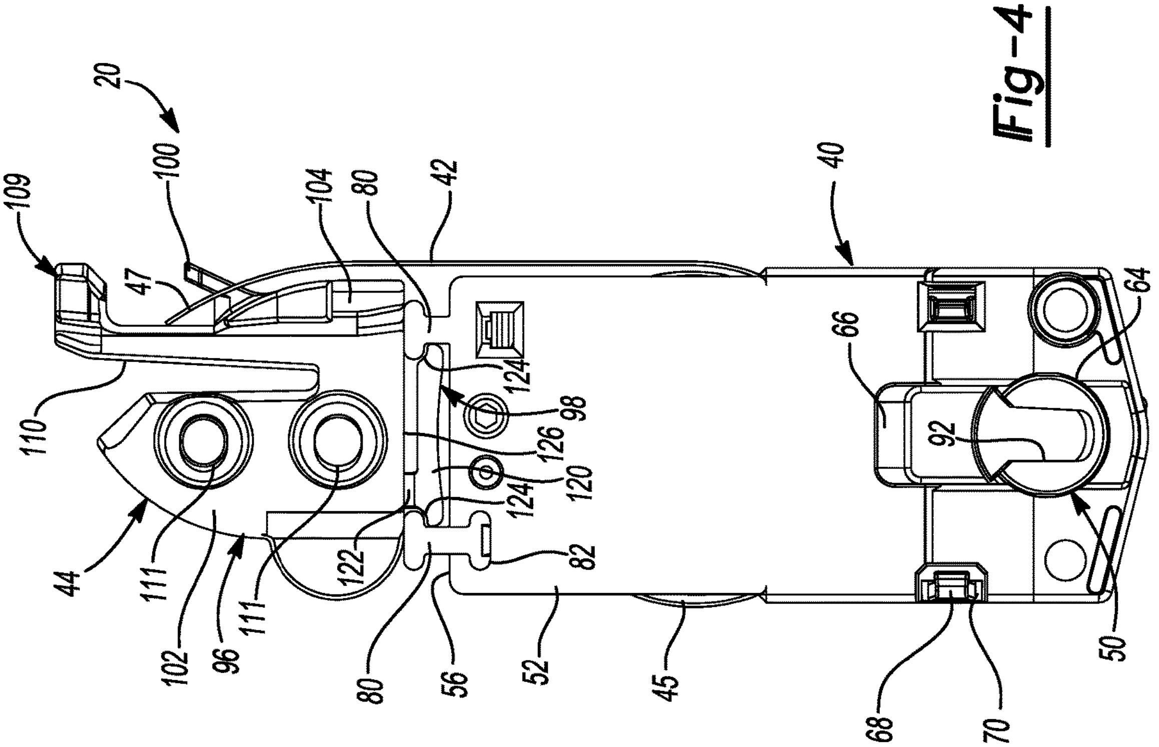
FIG. 4 is a side view of the window balance assembly of FIG. 2.
Figure 9:
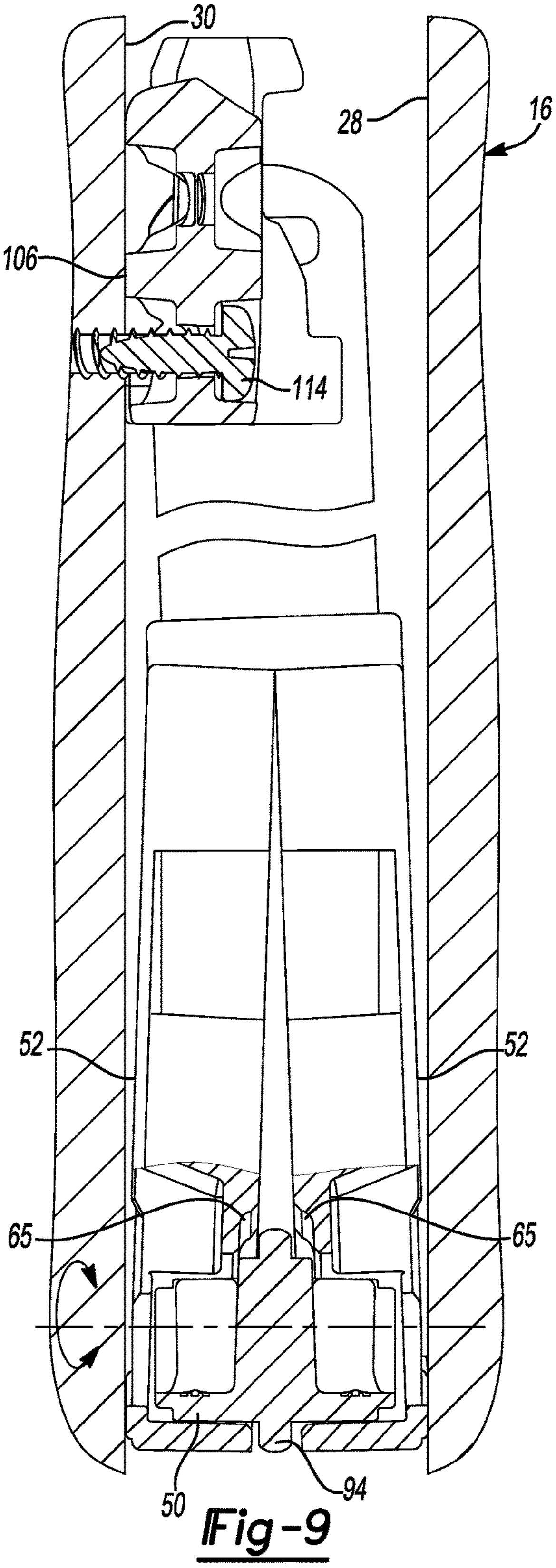
FIG. 9 is a side view of the window balance assembly in a second position according to the principles of the present disclosure.

When the lower sash 14 is tilted relative to the window jamb 16, the pivot bar 22 rotates the receiver 50 toward the orientation shown in FIGS. 4 and 9, in which the slotted recess 92 is oriented vertically and is generally aligned with the first slot 66 in the carrier 40. Rotating the receiver 50 in this manner moves the cam 94 out of the arcuate recess 65 and causes the cam 94 to force the interior faces 54 of the first and second housing portions 46, 48 away from each other. In this manner, the exterior faces 52 of the first and second housing portions 46, 48 are forced against the first and second walls 28, 30 of the jamb channel 26, as shown in FIG. 9. Forcing the exterior faces 52 outward against the first and second walls 28, 30 creates friction that may be sufficient to lock the carrier 40 in place relative to the jamb channel 26. Accordingly, when the lower sash 14 is in a tilted position, the window balance assembly 20 may be prevented from exerting a net upward force on the lower sash 14.

When the carrier 40 is locked in place within the jamb channel 26, the lower sash 14 can be removed from the window assembly 10 for maintenance or replacement, for example. To remove the lower sash 14, the pivot bars 22 can be removed from the receivers 50 by moving the pivot bars 22 upward out of the slotted recesses 92 and into the first slot 66 in the carriers 40. Thereafter, the pivot bars 22 can be removed from the window balance assemblies 20 so that the lower sash 14 can be removed from the window assembly 10.

The opposite procedure may be employed to install the lower sash 14 into the window assembly 10. That is, with the lower sash 14 tilted relative to the upper sash 12, the pivot bars 22 may be inserted into the first slots 66 in the carrier 40 and lowered into engagement with the slotted recesses 92 in the receivers 50. The lower sash 14 may then be pivoted to the upright position relative to the upper sash 12, which includes rotating the receiver 50 to the position shown in FIGS. 2 and 8. As described above, rotating the receiver 50 to the position shown in FIGS. 2 and 8 allows the first and second housing portions 46, 48 to fully close together, thereby reducing or eliminating friction between the carrier 40 and the jamb channel 26 to allow unrestricted movement of the carrier 40 therein.

The mounting bracket 44 may be formed from a polymeric material, for example, and may include a body portion 96 and an attachment portion 98. The body portion 96 may include a hook or latch 100, first, second, third and fourth mounting surfaces 102, 104, 106, 108 (FIG. 6), a slot 110, and one or more counterbored or countersunk mounting apertures 111. The latch 100 may extend generally upward and outward (relative to the view shown in FIG. 4) from the body portion 96 and may engage an aperture 112 in the uncurled portion 47 of the curl spring 42.

The first and second mounting surfaces 102, 104 may be substantially coplanar with each other and disposed at a non-perpendicular angle relative to the exterior face 52 of the first housing portion 46 when the window balance assembly 20 is in the uninstalled or shipping configuration (FIGS. 2 and 4). The third and fourth mounting surfaces 106, 108 may be substantially coplanar with each other and disposed at a non-perpendicular angle relative to the first and second mounting surfaces 102, 104 and relative to the exterior face 52 of the second housing portion 48 when the window balance assembly 20 is in the shipping configuration.

As shown in FIG. 6, when the window balance assembly 20 is in the installed configuration, the third and fourth mounting surfaces 106, 108 may abut the second wall 30 of the jamb channel 26 such that the third and fourth mounting surfaces 106, 108 may be substantially parallel with the exterior faces 52 of the first and second housing portions 46, 48 (FIGS. 6 and 8). One or more fasteners 114 may extend through the one or more mounting apertures 111 and engage the second wall 30 of the jamb channel 26 to secure the mounting bracket 44 to the window jamb 16. While not specifically shown in the figures, it will be appreciated that the window balance assembly 20 could be mounted within one of the window jambs 16 such that the second wall 30 abuts the first and second mounting surfaces 102, 104 rather than the third and fourth mounting surfaces 106, 108, as described above. In this manner, the carrier 40 and mounting bracket 44 may be symmetrical such that each one of the window balance assemblies 20 can be mounted on the left or right sides of the sash 14.

In some embodiments, the mounting bracket 44 may include a head portion 109 including a fifth mounting surface 113 or a sixth mounting surface 115 that may abut the third wall 32 of the jamb channel 26 when the window balance assembly 20 is in the installed configuration. The fifth mounting surface 113 may be substantially perpendicular to the third and fourth mounting surfaces 106, 108, and the sixth mounting surface 115 may be substantially perpendicular to the first and second mounting surfaces 102, 104. The head portion 109 may also contact the second wall 32 of the jamb channel 26 to keep the mounting bracket 44 generally upright as the fastener 114 is driven into the second wall 32 to secure the mounting bracket 44 thereto.

In some embodiments, a jamb cover 116 may engage the window jamb 16 and extend through the slot 110 in the mounting bracket 44, as shown in FIG. 6. The jamb cover 116 may engage the first wall 28 of the jamb channel 26 at or proximate the slot 36 via a snap fit, for example. The jamb cover 116 may extend vertically upward from the slot 110 toward an upper portion of the window jamb 16.

The attachment portion 98 of the mounting bracket 44 may include a platform 120 and an integrally formed breakaway tab 122. The platform 120 may include tapered or curved ends 124 that cooperate with a lower surface 126 of the body portion 96 to slidably engage the projections 80 of the carrier 40. When the window balance assembly 20 is in the shipping configuration (FIGS. 2 and 4), the breakaway tab 122 may be integrally formed with the body portion 96 and may interconnect the platform 120 with the body portion 96. As will be subsequently described, the relatively small cross section of the breakaway tab 122 may be a stress riser in the mounting bracket 44 such that when a sufficiently large force is applied to the body portion 96 by the fastener 114 during installation of the mounting bracket 44 into the window jamb 16, the breakaway tab 122 may fail or break to disengage the attachment portion 98 from the body portion 96. In some embodiments, failure of the breakaway tab 122 could include a fracture such that body portion 96 may be permanently removed from the attachment portion 98.

In some embodiments, the mounting bracket 44 could include additional or alternative stress risers that are adapted to fail (e.g., break, fracture, plastically or elastically deform) in response to a load or force applied to the mounting bracket 44 during installation of the window balance assembly 20 to disengage the mounting bracket 44 from the carrier 40. The stress risers could include any relatively thin cross-sectioned or relatively weak portion of the mounting bracket 44 in which localized stress therein resulting from the applied load or force is much higher relative to the rest of the mounting bracket 44. For example, the breakaway tab 122 may be configured to engage one or both of the body portion 96 and the platform 120 via a snap fit so that the attachment portion 98 can be repeatedly elastically deformed to remove the mounting bracket 44 from the carrier 40 and replace mounting bracket 44 back onto the carrier 40. In such embodiments, failure of the breakaway tab 122 that disengages the mounting bracket 44 from the carrier 40 may include elastic deformation or deflection of at least a portion of the tab 122 relative to at least a portion of the carrier 40. In other embodiments, the stress riser could be or include an adhesive, glue, tape, solder or other material used to join the mounting bracket 44 to the carrier 40 in the uninstalled configuration.

While the mounting bracket 44 is described above as including one or more stress risers that may fail to disengage the mounting bracket 44 from the carrier 40, in some embodiments, the carrier 40 may include one or more stress risers engaging the mounting bracket 44 in addition to or in the alternative to the stress risers on the mounting bracket 44. In still other embodiments, the mounting bracket 44 may be releasably secured to the carrier 40 by a stress riser that is separate and distinct from both the mounting bracket 44 and the carrier 40.

With continued reference to FIGS. 1-9, operation of the window balance assembly 20 will be described in detail. As described above, the window balance assembly 20 may be initially assembled and shipped in the shipping configuration shown in FIGS. 2 and 4. The window balance assembly 20 can be maintained in the shipping configuration up until the final steps of installation of the window balance assembly 20 into the window assembly 10. In this manner, the potential for damage and/or misalignment of to the various components of the window balance assembly 20 is reduced, as it may be unnecessary to remove the mounting bracket 44 from the carrier 40 and stretch the curl spring 42 to secure the mounting bracket 44 to the window jamb 16.

To secure the mounting bracket 44 to the second wall 30 of the window jamb 16, the window balance assembly 20 (while in the shipping configuration) may be positioned in the jamb channel 26 such that the mounting bracket 44 is at a desired height therein. The fastener 114 may be inserted through one of the mounting apertures 111 and driven into the second wall 30. As the installation of the fastener 114 into the second wall 30 begins to force the mounting bracket 44 against the second wall 30, the platform 120 and/or the head portion 109 may contact the second wall 30 while the body portion 96 is still spaced apart from the second wall 30. Continued tightening of the fastener 114 into the second wall 30 continues to draw the body portion 96 of the mounting bracket 44 toward the second wall 30 while contact between the second wall 30 and the platform 120 impedes further movement of the platform 120. This continued tightening of the fastener 114 may impart a twisting or torsional force T (FIG. 6) on the mounting bracket 44 which increases stresses therein. Because the breakaway tab 122 is a stress riser, in which stress may be concentrated, the torsional force that tightening of the fastener 114 exerts on the mounting bracket 44 may eventually cause the breakaway tab 122 to fail or break, thereby disengaging the platform 120 from the body portion 96. The fastener 114 may be subsequently tightened to securely fix the body portion 96 of the mounting bracket 44 to the second wall 30 in the manner described above and shown in FIGS. 6-9.

The pivot bar 22 of the lower sash 14 may be inserted in to the receiver 50 in the carrier 40, as described above, after the mounting bracket 44 is secured to the window jamb 16. Thereafter, the lower sash 14 may be rotated about the pivot bar 22 to the upright position. In the upright position, the curl spring 42 may exert an upward force on the lower sash 14 which assists a user in moving the lower sash 14 vertically upward toward an open position and allows the lower sash 14 to be maintained in a selected position relative to the window sill 18.

Figure 10:
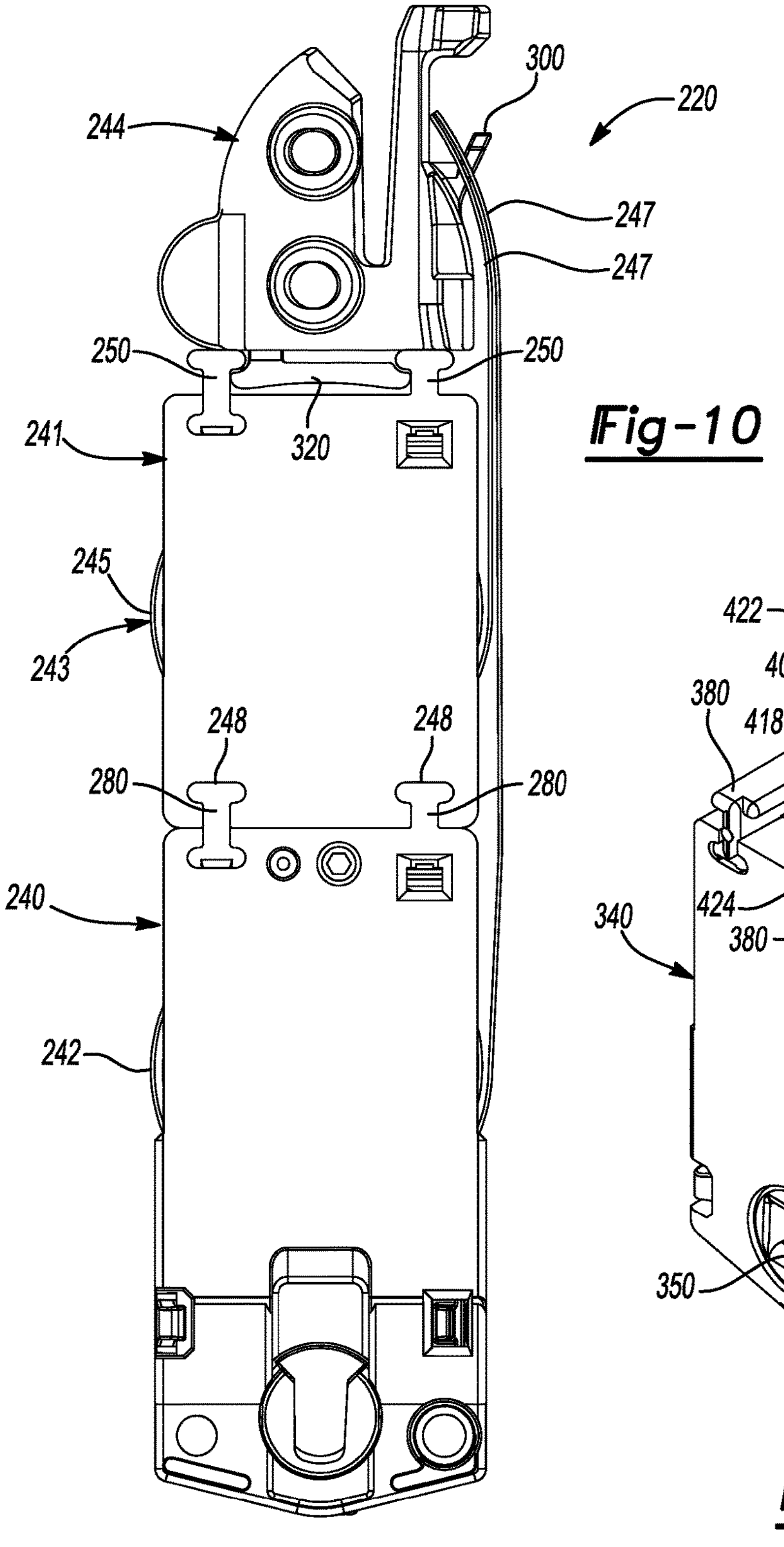
FIG. 10 is a side view of a window balance assembly having tandem carriers and springs according to the principles of the present disclosure.

With reference to FIG. 10, a tandem window balance assembly 220 is provided and may include a carrier 240, a companion carrier 241, a first curl spring 242, a second curl spring 243, and a mounting bracket 244. The tandem window balance assembly 220 may be incorporated into the window assembly 10 to bias the lower sash 14 upward as described above. The structure and function of the first carrier 240, the first curl spring 242, and the mounting bracket 244 may be substantially similar to the carrier 40, curl spring 42 and mounting bracket 44 described above, and therefore, will not be described again in detail.

The companion carrier 241 may be generally similar to the carrier 240, except the companion carrier 241 may be lacking the receiver 50. The companion carrier 241 may be attached to the carrier 240 and the mounting bracket 244 in the shipping configuration shown in FIG. 10. The companion carrier 241 may include a pair of housing portions 246 that may be generally similar to the first and second housing portions 46, 48 and may cooperate to form a nest that receives a curled portion 245 of the second curl spring 243. The companion carrier 241 may include a pair of generally T-shaped slots 248 and a pair of projections 250. The slots 248 may slidably engage a pair of projections 280 of the first carrier 240. The projections 250 may slidably engage the platform 320 of the mounting bracket 244 in the manner described above with respect to the window balance assembly 20.

Uncurled ends 247 of both of the first and second curl springs 242, 243 may engage a latch 300 on the mounting bracket 244. When the window balance assembly 220 is in an installed configuration, the carrier 240 and companion carrier 241 may be movable with the lower sash 14 relative to the mounting bracket 244. Because the window balance assembly 220 includes both curl springs 242, 243, the upward biasing force of the window balance assembly 220 may be greater than that of a window balance assembly having only one curl spring. It will be appreciated that the window balance assembly 220 could have one or more additional companion carriers and curl springs to provide a desired amount of upward force to accommodate the weights of various sashes.

Figure 11:
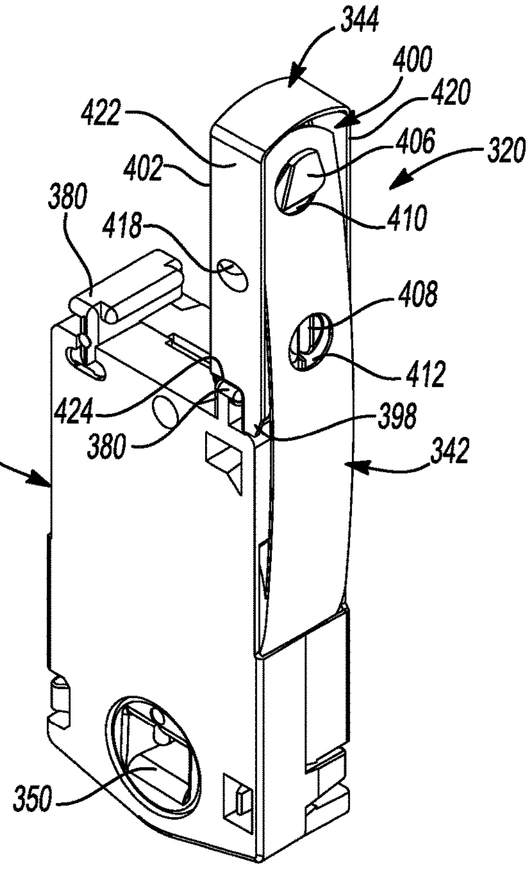
FIG. 11 is a perspective view of another window balance assembly according to the principles of the present disclosure.
Figure 12:
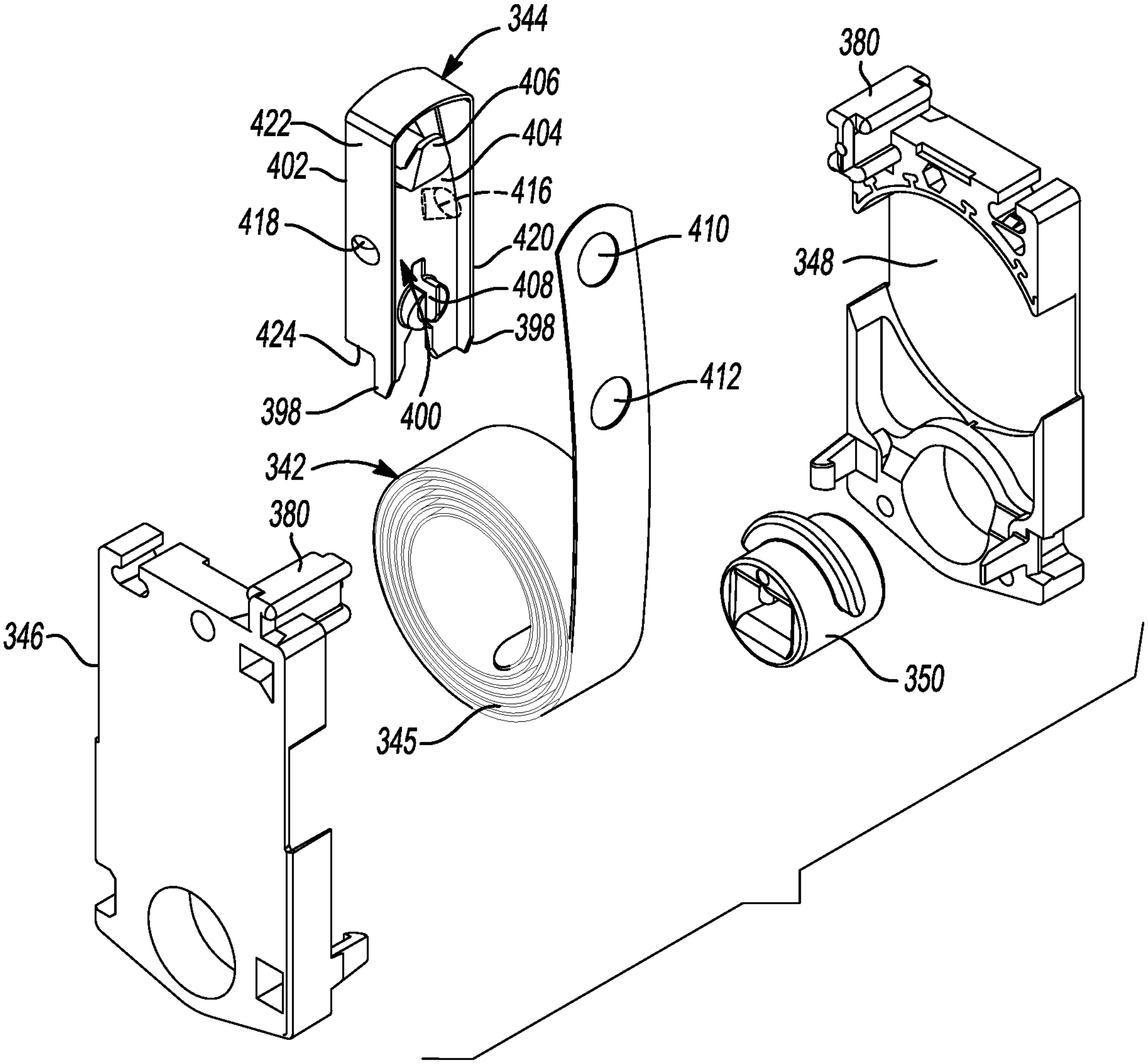
FIG. 12 is an exploded perspective view of the window balance assembly of FIG. 11.
Figure 13:
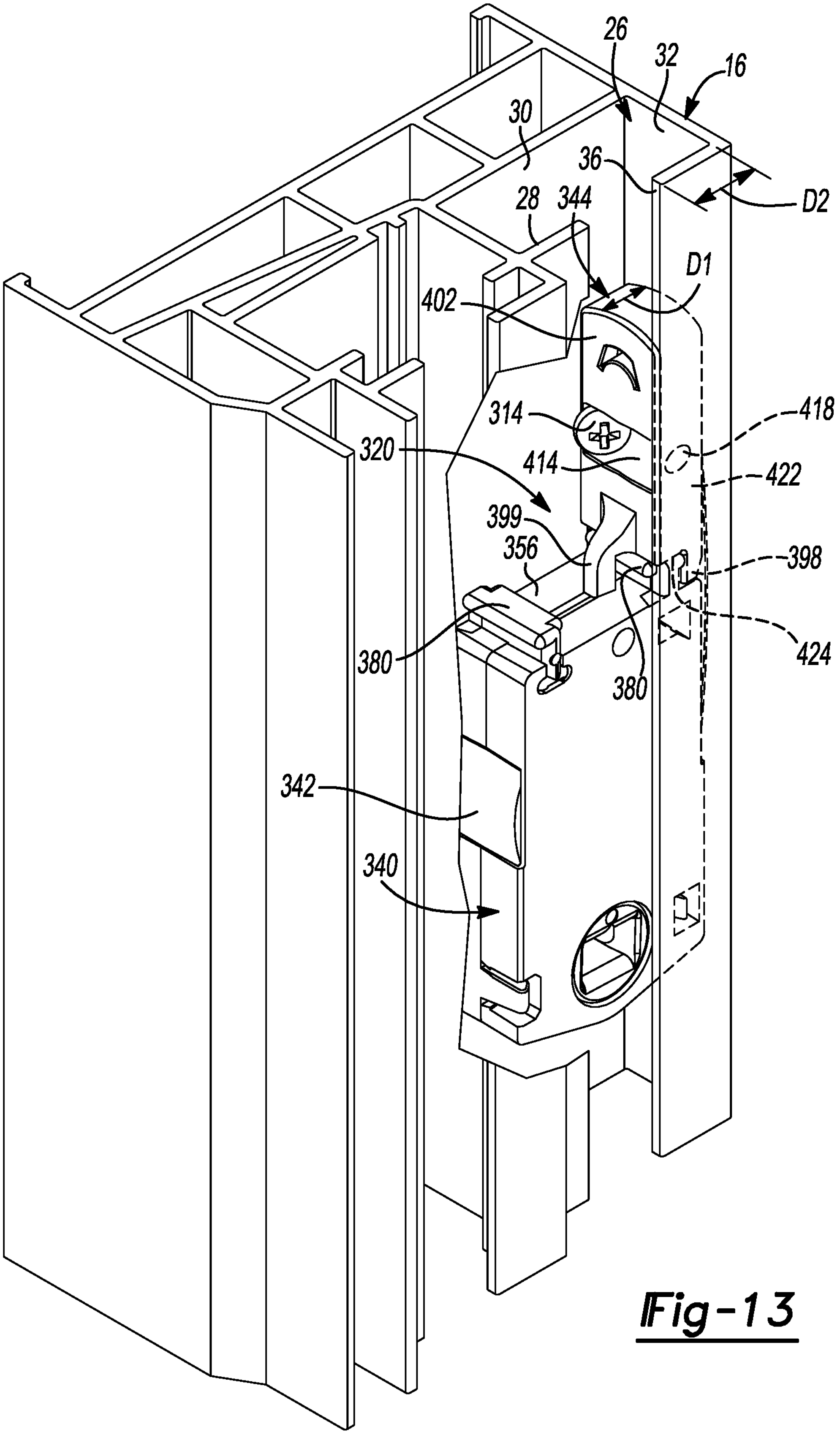
FIG. 13 is a partially cut-away perspective view of the window balance assembly of FIG. 11 installed in a window jamb.

With reference to FIGS. 11-13, a window balance assembly 320 is provided and may include a carrier 340, a curl spring 342, and a mounting bracket 344. The window balance assembly 320 may be incorporated into the window assembly 10 to bias the lower sash 14 upward as described above. The structure and function of the carrier 340 and the curl spring 342 may be substantially similar to the carrier 40 and curl spring 42 described above, and therefore, will not be described again in detail. Briefly, the carrier 340 may include first and second housing portions 346, 348 and a receiver 350. The first and second housing portions 346, 348 may include projections 380 and may cooperate to house a curled portion 345 of the curl spring 342 in the manner described above. The receiver 350 rotatably engages the first and second housing portions 346, 348 and receives the pivot bar 22 of the lower sash 14.

The mounting bracket 344 may be formed from a polymeric material, for example, and may include a body portion 396, one or more first legs 398, and one or more second legs 399. The body portion 396 may include a first side 400 and a second side 402. The first side 400 may include a recess 404 having first and second latch members 406, 408 that engage first and second apertures 410, 412, respectively, of an uncurled portion 347 of the curl spring 342. The uncurled portion 347 of the curl spring 342 may be at least partially received in the recess 404. The second side 402 of the body portion 396 may include a recessed portion 414 (FIG. 13) having first and second apertures 416, 418 extending therefrom at non-perpendicular angles relative to the first and second sides 400, 402 through third and fourth sides 420, 422, respectively, of the body portion 396.

The first and second legs 398, 399 may extend from a lower end 424 of the body portion 396 and may straddle one of the projections 380. In the uninstalled or shipping configuration, the first and second legs 398, 399 may contact an upper end 356 of the carrier 340. In the uninstalled or shipping configuration, the downward force of the curl spring 342 on the latch members 406, 408 may retain the mounting bracket 344 on the carrier 340 in the position shown in FIG. 11 with the first and second legs 398, 399 straddling the projection 380. A distance between the first and second legs 398, 399 may be larger than a width of the projection 380 such that the mounting bracket 344 and the carrier 340 are substantially unimpeded by the projection 380 and the first and second legs 398, 399 from moving linearly away from each other.

The window balance assembly 320 may be installed within the jamb channel 26, as shown in FIG. 13, by securing the mounting bracket 344 therein at a selected location. The window balance assembly 320 may be positioned within the jamb channel 26 such that the first and third sides 400, 420 of the mounting bracket 344 are abutting the third and second walls 32, 30, respectively, of the jamb channel 26. A fastener 314 may be inserted through the first aperture 416 and driven into the second wall 30 to fix the mounting bracket 344 relative to the window jamb 16. With the mounting bracket 344 fixed in the jamb channel 26, the carrier 340 can be moved downward (relative to the view shown in FIG. 13) and may be unimpeded by contact or friction between the projection 380 and the first and second legs 398, 399.

As shown in FIG. 13, the body portion 396 of the mounting bracket 344 may include a thickness dimension D1. The thickness D1 may be less than or approximately equal to a distance D2 between the second wall 32 and an edge of the slot 36. In such an embodiment, when the window balance assembly 320 is installed in the window jamb 16, the body portion 396 of the mounting bracket 344 may be disposed entirely between the third wall 32 and the slot 36 in the first wall 28. In this manner, the mounting bracket 344 may remain relatively concealed from view when the window balance assembly 320 is installed in the window assembly 10.

While not specifically shown in the figures, in some embodiments, the mounting bracket 344 could be secured to the carrier 340 in an uninstalled configuration by a stress riser such as an adhesive, glue, tape, solder or other joining material. Additionally or alternatively, the mounting bracket 344 and/or the carrier 340 could include other types of stress risers that may snap, crack, break, bend, stretch, or deflect to allow the mounting bracket 344 to disengage the carrier 340.

With reference to FIGS. 14-17, a window balance assembly 520 is provided and may include a carrier 540, a curl spring 542, a mounting bracket 544, and a debris cup or dam 545. The window balance assembly 520 may be incorporated into the window assembly 10 to bias the lower sash 14 upward as described above. The structure and function of the carrier 540 and the curl spring 542 may be substantially similar to that of the carrier 40 and curl spring 542 described above, and therefore, will not be described again in detail. Briefly, the carrier 540 may include first and second housing portions 546, 548 and a receiver 550. The first and second housing portions 546, 548 may include projections 580 and may cooperate to house a curled portion of the curl spring 542 in the manner described above. The receiver 550 rotatably engages the first and second housing portions 546, 548 and receives the pivot bar 22 of the lower sash 14.

Figure 14:
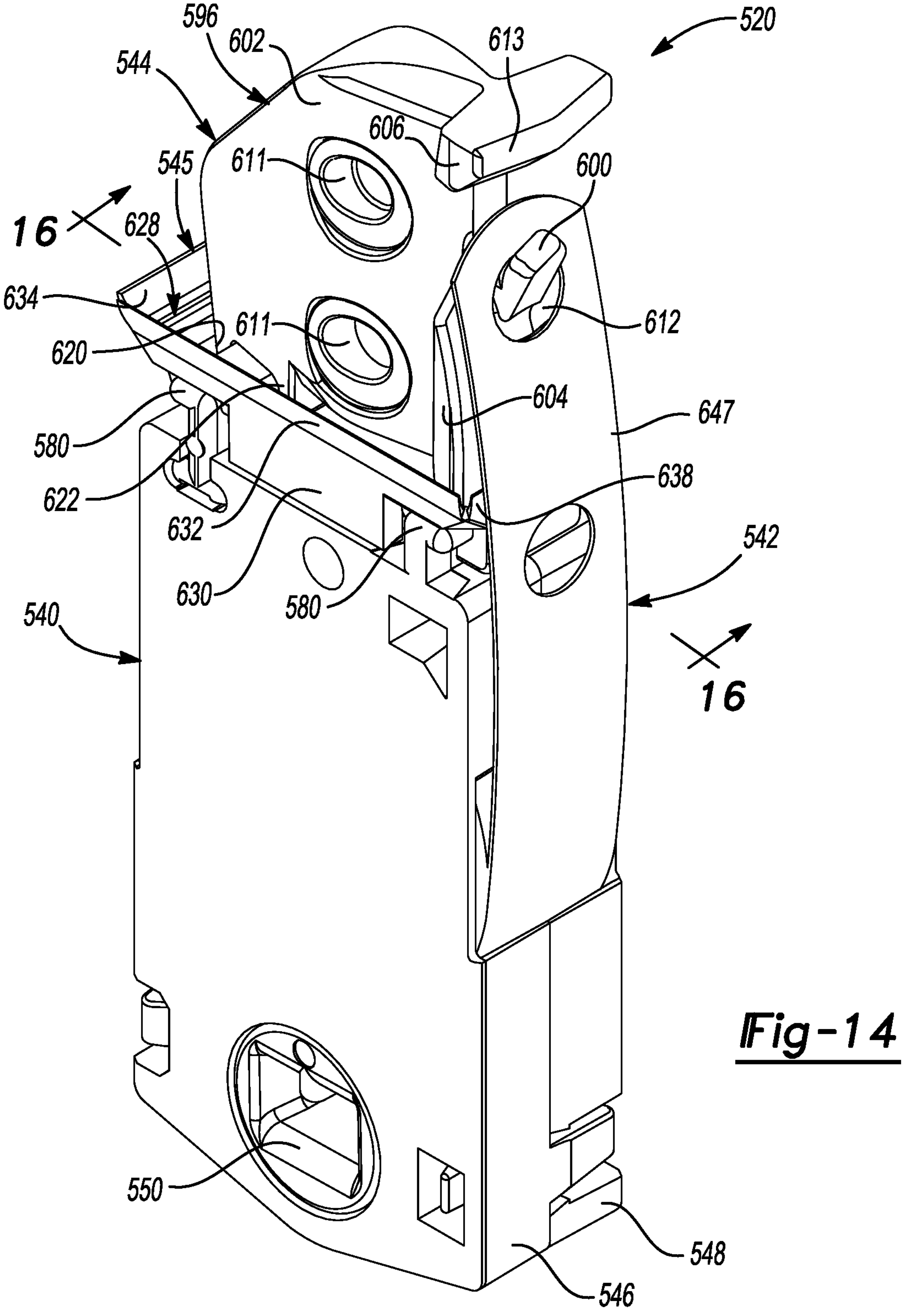
FIG. 14 is a perspective view of yet another window balance assembly having a debris dam according to the principles of the present disclosure.

The mounting bracket 544 may be generally similar to the mounting bracket 44 described above, apart from exceptions noted below. The mounting bracket 544 may be formed from a polymeric material, for example, and may include a body portion 596 and an attachment portion 598. The body portion 596 may include a leg 599, a latch 600, first, second, and third mounting surfaces 602, 604, 606, and one or more counterbored or countersunk mounting apertures 611. The latch 600 may extend generally upward and outward (relative to the view shown in FIG. 14) from the body portion 596 and may engage an aperture 612 in an uncurled portion 647 of the curl spring 542. The first, second and third mounting surfaces 602, 604, 606 may be substantially coplanar with each other and disposed at a non-perpendicular angle relative to the exterior face 552 of the first housing portion 546 when the window balance assembly 520 is in the uninstalled or shipping configuration (FIG. 14).

Figure 17:
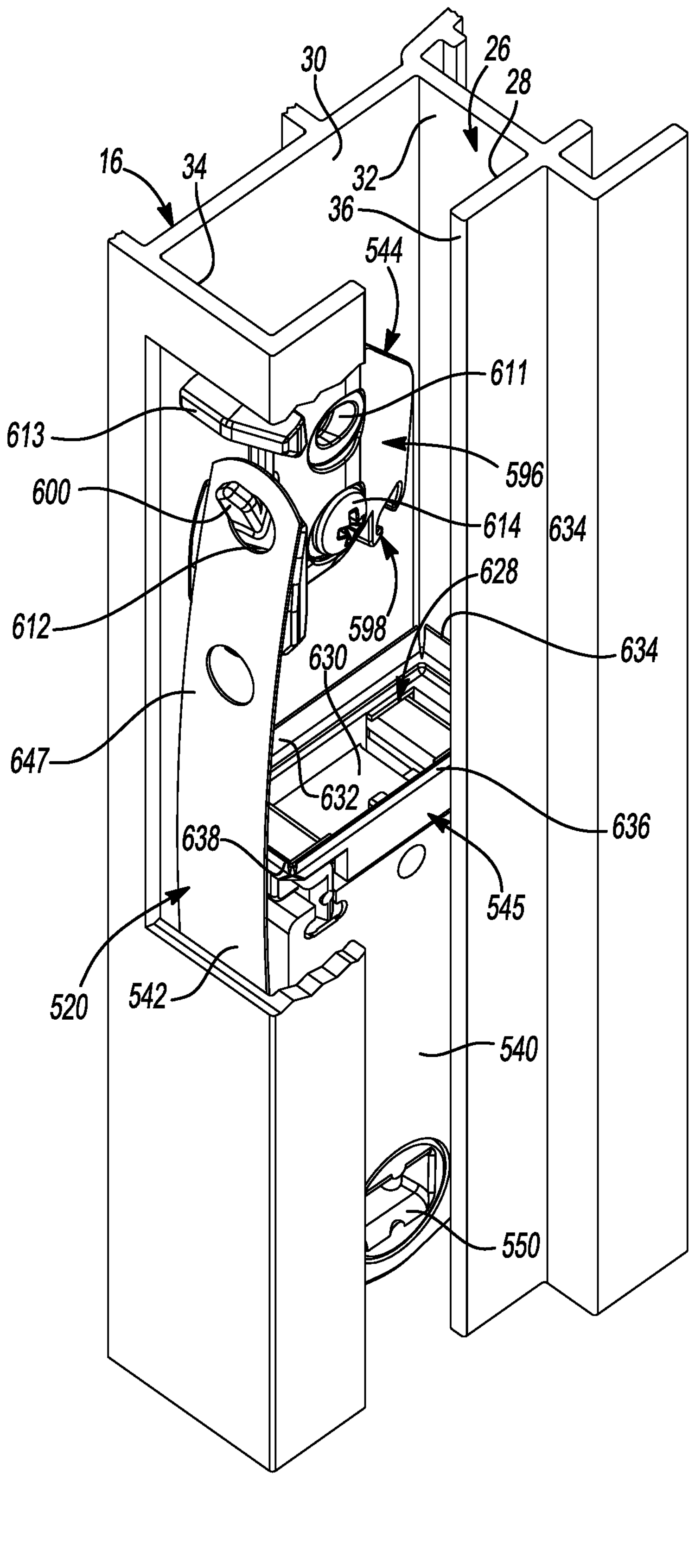
FIG. 17 is a partially cut-away perspective view of the window balance assembly of FIG. 14 installed in a window jamb.

As shown in FIG. 17, when the window balance assembly 520 is in an installed configuration, the first, second and third mounting surfaces 602, 604, 606 may abut the second wall 30 of the jamb channel 26 and may be substantially parallel with the exterior faces 552 of the first and second housing portions 546, 548. One or more fasteners 614 may extend through the one or more mounting apertures 611 and engage the second wall 30 of the jamb channel 26 to secure the mounting bracket 544 to the window jamb 16. In some embodiments, a fourth mounting surface 613 may abut the fourth wall 34 of the jamb channel 26 when the window balance assembly 520 is in the installed configuration. The fourth mounting surface 613 may be substantially perpendicular to the first, second and third mounting surfaces 602, 604, 606.

The attachment portion 598 may include first and second breakaway tabs 620, 622 that may cooperate to form a generally T-shaped slot 624 (FIG. 16). The first and second breakaway tabs 620, 622 may engage the projection 580 via a snap fit, for example. The slot 624 may receive one of the projections 580 of the carrier 540 in the shipping configuration (FIGS. 14 and 16). The leg 599 may engage the other of the projections 580. In some embodiments, the attachment portion 598 may include only one of the first and second breakaway tabs 620, 622 that may engage the projection 580 via a snap fit.

In a manner similar to installation of the mounting bracket 44 described above, when the mounting bracket 544 is fastened to the second wall 30 of the jamb channel 26, the fastener 614 may impart a force on the mounting bracket 544 relative to the carrier 540. This force may cause one or both of the first and second tabs 620, 622 to fail by either breaking off, plastically or elastically deflecting away from the projection 580 so that the mounting bracket 544 can disengage the projection 580.

The debris dam 545 may engage the carrier 540 and may be disposed generally between the carrier 540 and the mounting bracket 544. The debris dam 545 may be formed from a polymeric material such as a hydrocarbon-based elastomer, for example, and may include a generally rectangular shape to correspond to the rectangular shape of the jamb channel 26. The debris dam 545 may include a cavity or reservoir 628 defined by a base portion 630 and first, second, third and fourth wipers 632, 634, 636, 638 extending generally upward and outward from the base portion 630. The first, second, third and fourth wipers 632, 634, 636, 638 may be resiliently pliable or deflectable. In some embodiments, the first, second, third and fourth wipers 632, 634, 636, 638 may be integrally formed with the first and second housing portions 546, 548 of the carrier 540. The debris dam 545 may be substantially symmetrical to allow any one debris dam 545 to be mounted in a window balance assembly on either of the left and rights sides of the sash 14.

The base portion 630 may include first and second channels 640, 642 that may slidably engage the projections 580 of the carrier 540. First and second slots 644, 646 may also be formed in the base portion 630 to provide clearance for the first and second tabs 620, 622 and the leg 599, respectively, so that the window balance assembly 520 can be moved between the shipping configuration (FIGS. 14 and 16) and the installed configuration (FIG. 17) without removing the debris dam 545 from the carrier 540.

In the installed configuration, the first, second, and third wipers 632, 634, 636 may be in contact with a corresponding one of the first, second, and third walls 28, 30, 32, and the fourth wiper 638 may contact the uncurled portion 647 of the curl spring 542. In this manner, when the carrier 540 moves up and down in the jamb channel 26, the wipers 632, 634, 636, 638 may wipe dust, dirt, and/or other contaminants or debris from the first, second, and third walls 28, 30, 32 and the curl spring 542. As the wipers 632, 634, 636, 638 remove debris from the walls 28, 30, 32 and curl spring 542, the debris may fall into the cavity 628 and accumulate therein. In this manner, the debris dam 545 prevents a build-up of debris in the jamb channel 26 and on the curl spring 542, thereby preventing debris from increasing friction between moving parts of the window assembly 10. While the wipers 632, 634, 636, 638 contact the walls 28, 30, 32 and the curl spring 542 while the carrier 540 moves up and down within the jamb channel 26, the friction therebetween may be minimal due to the relative pliability of the wipers 632, 634, 636, 638.

Figure 18:
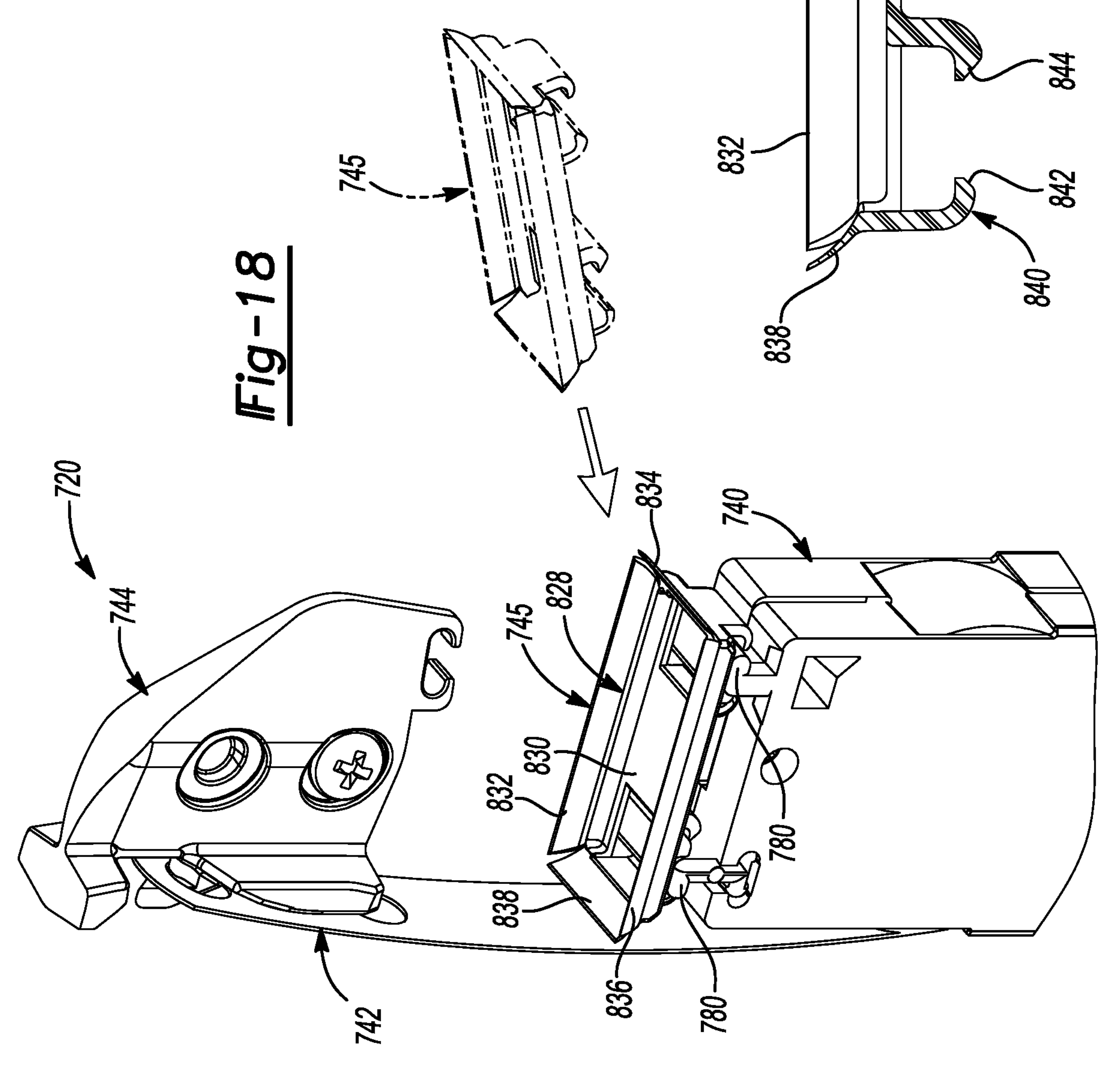
FIG. 18 is a perspective view of a window balance assembly having another embodiment of a debris dam according to the principles of the present disclosure.
Figure 19:
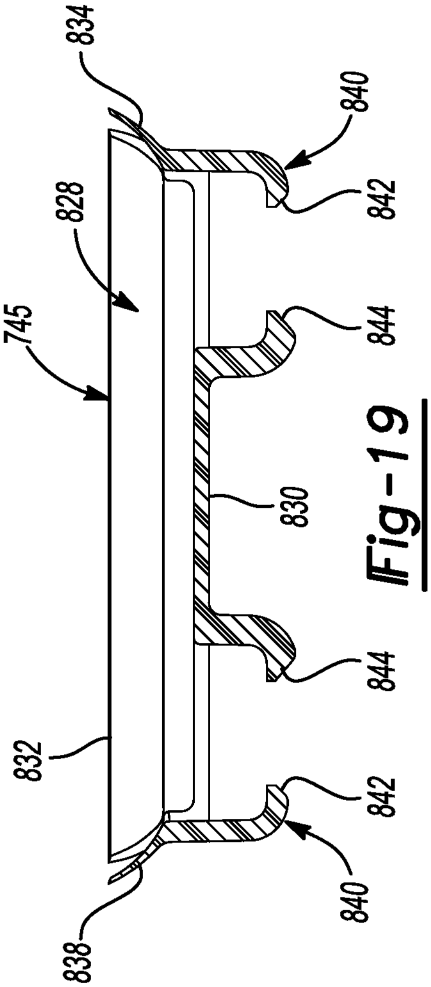
FIG. 19 is a cross-sectional view of the debris dam of FIG. 18.

With reference to FIGS. 18 and 19, another window balance assembly 720 is provided and may include a carrier 740, a curl spring 742, a mounting bracket 744, and a debris dam 745. The window balance assembly 720 may be incorporated into the window assembly 10 to bias the lower sash 14 upward as described above. The structure and function of the carrier 740 and the curl spring 742 may be substantially similar to that of the carrier 40 and curl spring 742 described above, and therefore, will not be described again in detail. Briefly, the carrier 740 may include projections 780 and may cooperate to house a curled portion of the curl spring 742 in the manner described above.

The structure and function of the mounting bracket 744 may be substantially similar to that of any of the mounting brackets 44, 244, 344, 544 described above. The mounting bracket 744 may engage an uncurled portion of the curl spring 742 and may be engaged with the carrier 740 in an uninstalled or shipping configuration and may be separated from the carrier 740 to allow movement of the carrier 740 in the installed configuration.

The debris dam 745 may be similar in structure and function as the debris dam 545 apart from any exceptions noted below. The debris dam 745 may include a cavity or reservoir 828 defined by a base portion 830 and first, second, third and fourth wipers 832, 834, 836, 838 extending generally upward and outward from the base portion 830. The first, second, third and fourth wipers 832, 834, 836, 838 may be resiliently pliable or deflectable.

The base portion 830 may include one or more attachment portions 840 that may include first and second resiliently flexible tabs 842, 844. The first and second tabs 842, 844 may engage the projections 780 of the carrier 740 via a snap fit, for example. Because the tabs 842, 844 engage the projections 780 via a snap fit, the debris dam 745 may be installed onto the carrier 740 after the window balance assembly 720 has been installed in the window jamb 16 (i.e., when the window balance assembly 720 is in the installed configuration). Because the debris dam 745 can be snap fit onto the carrier 740 after installation of the window balance assembly 720, the debris dam 745 need not provide clearance for the mounting bracket 744 to engage the carrier 740.

With reference to FIGS. 20-23, yet another window balance assembly 920 is provided and may include a carrier 940, a curl spring 942, and a mounting bracket 944. The window balance assembly 920 may be incorporated into the window assembly 10 to bias the lower sash 14 upward as described above. Similar to the window balance assemblies 20, 220, 320, 520, 720, the window balance assembly 920 can be shipped as a unitary assembly in the shipping configuration (shown in FIGS. 20 and 21) and can be installed in the window jamb 16 in the installed configuration (shown in FIGS. 22 and 23).

The structure and function of the carrier 940 and the curl spring 942 may be substantially similar to any of the carriers 40, 240, 340, 540, 740 and curl springs 42, 242, 342, 542, 742 described above, and therefore, will not be described again in detail. Briefly, the carrier 940 may include first and second housing portions 946, 948 having projections 980 and cooperating to house a curled portion 945 of the curl spring 942 in the manner described above. The carrier 940 may engage pivot bars 22 and may be movable with the lower sash 14 in the manner described above.

The mounting bracket 944 may be formed from a polymeric material, for example, and may include a body portion 950, a head 952, a base 954, and a tab 956. The mounting bracket 944 may be substantially symmetric about a plane defining the body portion 950 and extending through the head 952, base 954, and tab 956. The structure and function of the base 954 and the tab 956 simplify assembly of the mounting bracket 944 to the carrier 940 (i.e., assembly into the shipping configuration).

The body portion 950 may include a pair of bosses 960 disposed on opposite sides of the body portion 950. A mounting aperture 962 may extend through both of the bosses 960. Each of the bosses 960 may include countersink surfaces 961 surrounding the bosses 960 and first and second surfaces 964, 966 surrounding the countersink surfaces 961. The first and second surfaces 964, 966 may be disposed at non-perpendicular angles relative to each other and relative to exterior faces 968 of the carrier 940 when the window balance assembly 920 is the shipping configuration. The body portion 950 may also include a pair of tapered surfaces 970. Each tapered surface 970 may be substantially coplanar with the first surface 964 on the corresponding side of the body portion 950 (see FIG. 23).

A latch 972 may extend generally upward and outward from the body portion 950 between the head 952 and the base 954. The latch 972 may engage an aperture 943 in the curl spring 942. The latch 972 may include a lip 973 and may be in relatively close proximity to the head 952 to prevent or reduce inadvertent disengagement between the curl spring 942 and the latch 972.

Figure 23:
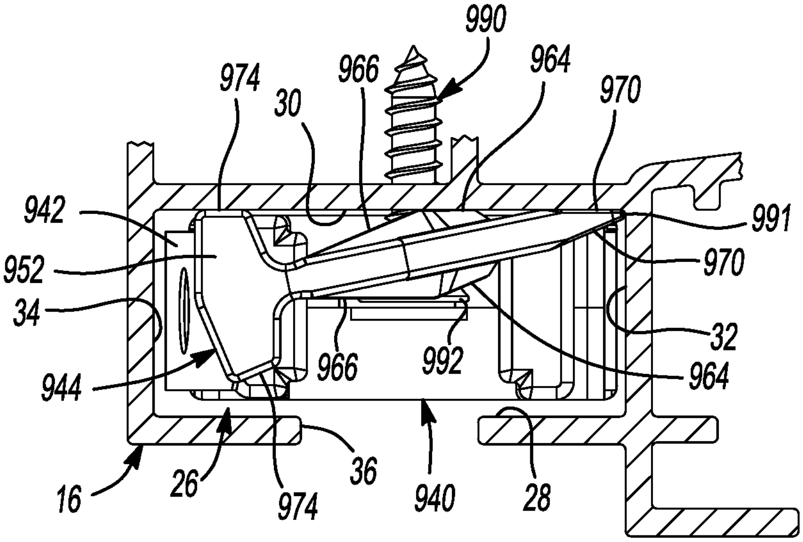
FIG. 23 is a cross-sectional view of the window balance assembly and window jamb of FIG. 22.

The head 952 may extend laterally outward from the body portion 950 and may include a pair of third surfaces 974 and a pair of fourth surfaces 975. Each of the third surfaces 974 may be substantially coplanar with the first surface 964 and tapered surface 970 on the corresponding side of the body portion 950. One of the third surfaces 974 may abut the second wall 30 of the jamb channel 26 while the mounting bracket 944 is being fastened to thereto and when the window balance assembly 920 is in the installed configuration, as shown in FIG. 23. Each of the fourth surfaces 975 may be substantially perpendicular to an adjacent one of the third surfaces 974.

Figure 21:
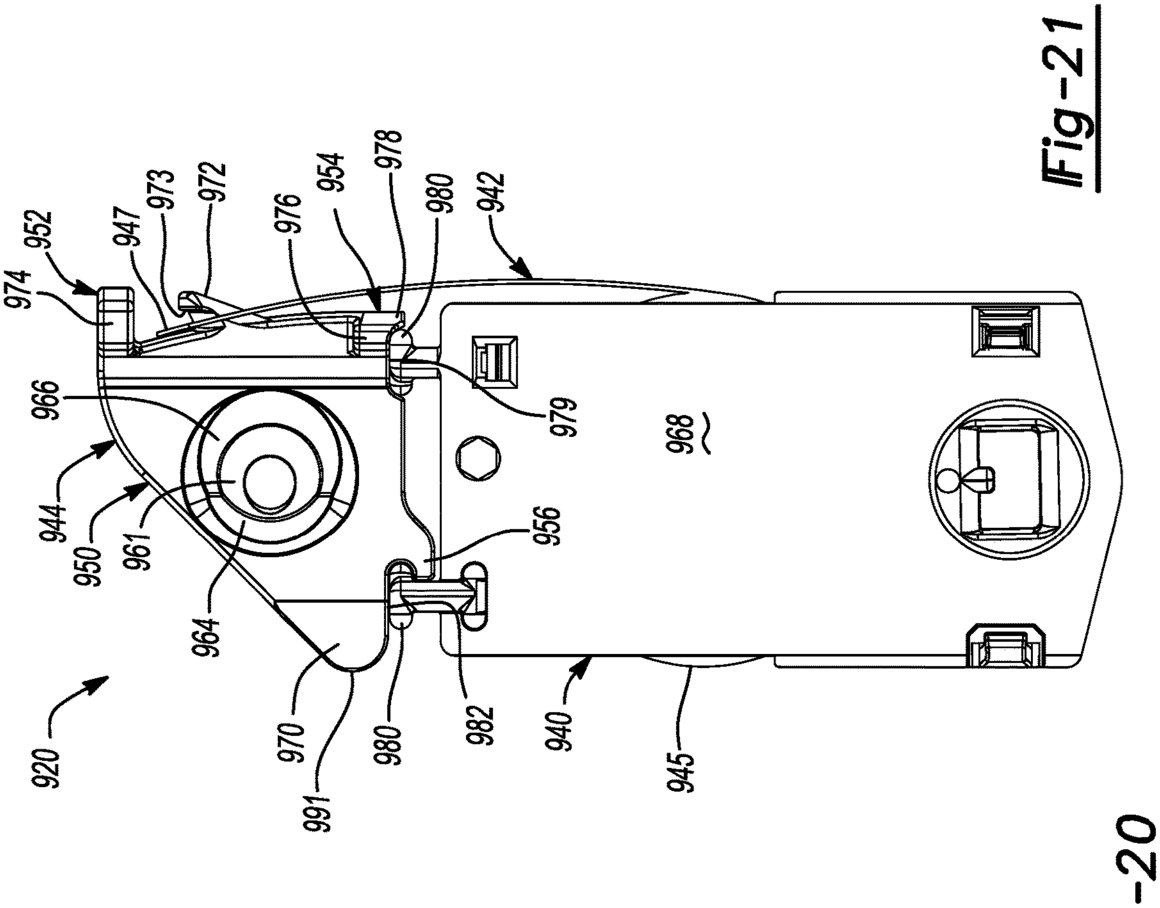
FIG. 21 is a side view of the window balance assembly of FIG. 20.
Figure 20:
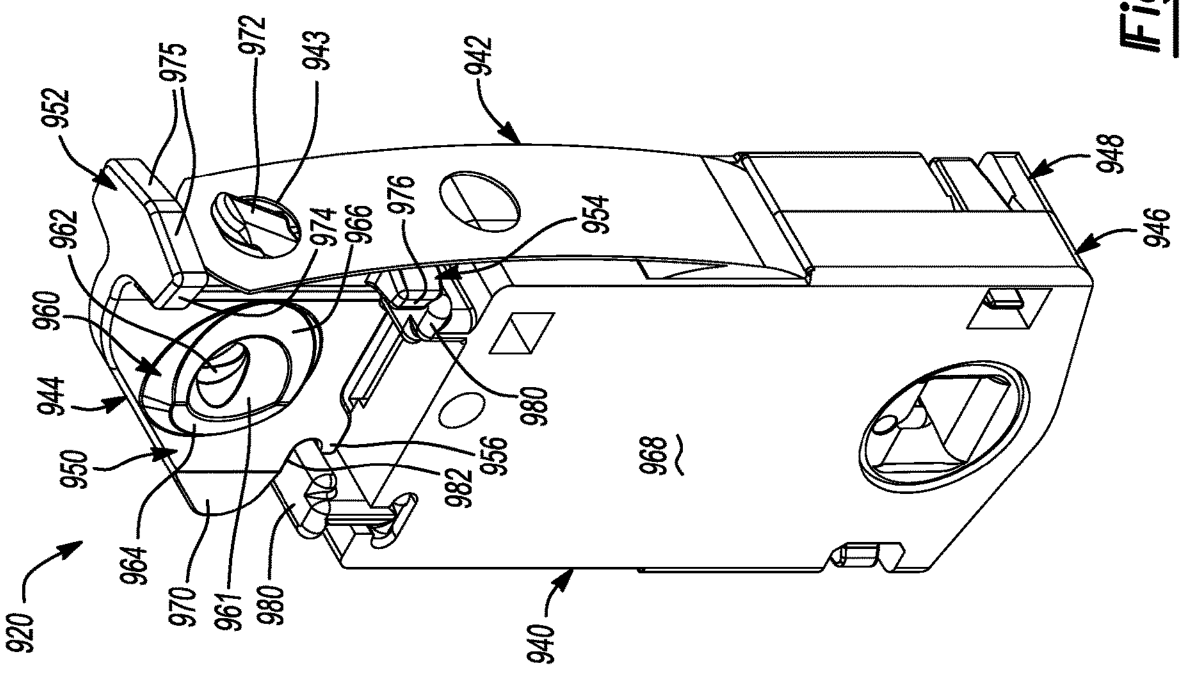
FIG. 20 is a perspective view of yet another window balance assembly according to the principles of the present disclosure.
Figure 22:
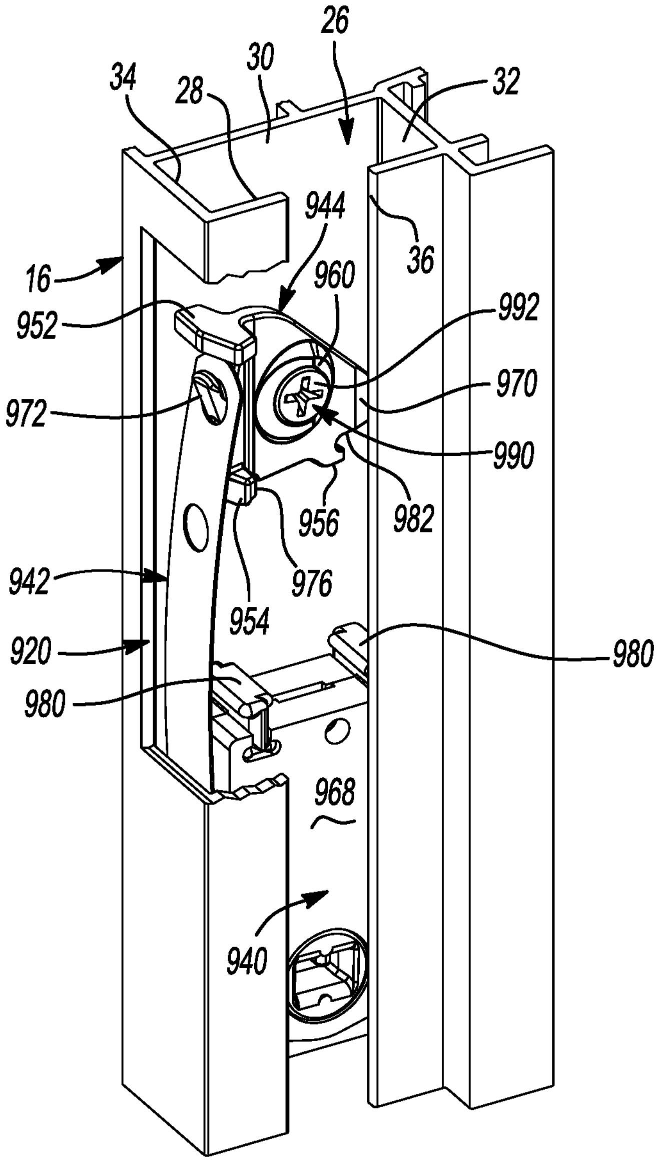
FIG. 22 is a partially cutaway perspective view of the window balance assembly of FIG. 20 installed in a window jamb.

The base 954 may extend laterally outward from the body portion 950 and may include a pair of fifth surfaces 976 and a leg portion 978 (FIG. 21). Each of the fifth surfaces 976 may be on laterally opposite ends of the base 954 and may be substantially coplanar with the first surface 964, third surface 974 and tapered surface 970 on the corresponding side of the body portion 950. The leg portion 978 may cooperate with a first lower surface 979 of the body portion 950 to form a recess receiving one of the projections 980 of the carrier 940, as shown in FIG. 21. The lateral span of the base 954 that engages the projection 980 provides increased stability of the mounting bracket 944 relative to the carrier 940 in the shipping configuration. This stability may prevent or reduce inadvertent disengagement of the mounting bracket 944 from the carrier 940 prior to installation of the window balance assembly 920 into the window assembly 10.

The mounting bracket 944 may be symmetric in that it includes each of the first surface 964, tapered surface 970, third surface 974 and the fifth surface 976 on each side of the mounting bracket 944. This symmetry allows the mounting bracket 944 to be universal, in that it can be installed in window jambs on both the left and right sides of the sashes 12, 14. This feature further reduces the total number of unique components and subassemblies that may be required for an installation of a single window assembly.

The tab 956 may extend from a second lower surface 982 and may cooperate with the second lower surface 982 to engage at least a portion of the other of the projections 980. In some embodiments, the tab 956 may slidably engage the projection 980. In some embodiments, the tab 956 may snap into and out of engage with the projection 980 or breakaway from the projection 980.

With continued reference to FIGS. 20-23, installation and operation of the window balance assembly 920 will be described. While still in the shipping configuration, the window balance assembly 920 may be received into the jamb channel 26 and positioned therein such that the mounting bracket 944 is disposed at a desired height relative to the window sill 18. A fastener 990 may be inserted through the mounting aperture 962 and driven into the second wall 30. As the fastener 990 is driven into the second wall 30, the head 952 may abut the second wall 32 and may provide a pivot point or axis about which the rest of the mounting bracket 944 may twist relative to the carrier 940 such that the first surface 964, tapered surface 970, third surface 974 and the fifth surface 976 on a corresponding side of the mounting bracket 944 may abut the second wall 30. This relative twisting motion may cause the tab 956 to slide and/or snap out of engagement with the corresponding projection 980, thereby disengaging the mounting bracket 944 from the carrier 940. In some embodiments, an edge 991 of the body portion 950 directly adjacent both of the tapered surfaces 970 may abut the third wall 32 of the jamb channel 26 to provide additional stability for the mounting bracket 944 in the installed configuration.

As the fastener 990 is further driven into the second wall 30, tightening the mounting bracket 944 against the second wall 30, a head 992 of the fastener 990 may seat against the countersink surface 961 of the mounting aperture 962. The fastener 990 may be tightened to a desired torque and/or until the head 992 is fully seated against the countersink surface 961 such that a flat surface of the head 992 may be substantially flush or sub-flush with the one of the second surfaces 966 that faces the slot 36 in the jamb channel 26, as shown in FIG. 23. Tightening the fastener 990 against the mounting bracket 944 in this manner may allow the first surface 964, tapered surface 970, third surface 974 and the fifth surface 976 to securely engage the second wall 30 and allow the edge 991 to securely engage the third wall 32, thereby providing stable and robust engagement between the mounting bracket 944 and the window jamb 16. Furthermore, seating the head 992 of the fastener 990 against the countersink surface 961 in the manner described above provides additional clearance for the tilt latch mechanism 24 to move within the jamb channel 26.

The carrier 940 can receive the pivot bar 22 of the lower sash 14 in the manner described above. In the installed configuration, the mounting bracket 944 may be substantially fixed relative to the window jamb 16. The carrier 940 may be movable with the lower sash 14 relative to the mounting bracket 944 and window jamb 16 between open and closed positions, as described above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A window balance assembly comprising:

a mounting bracket comprising a body portion, a first connection member and a second connection member;

a carrier comprising a housing extending along a longitudinal axis from a first end to a second end, the housing comprising a first housing portion and a second housing portion which together define an interior space of the housing, and an arcuate surface located in the interior space that extends perpendicularly to the longitudinal axis; and a receiver supported by the carrier near the second end of the carrier and comprising a cam rotatable about a first axis between a first position and a second position, wherein rotation of the cam from the first position to the second position operates to change a dimension of the carrier;

a constant force curl spring comprising a curled portion disposed substantially within the interior space of the housing of the carrier and an uncurled portion extending outside of the interior space of the housing of the carrier and terminating at a distal end, wherein the uncurled portion comprises a first engagement feature and a second engagement feature;

wherein the first engagement feature and the second engagement feature of the uncurled portion of the curl spring are spaced from one another along a length of the uncurled portion and the first engagement feature is located nearer the distal end of the uncurled portion of the curl spring than the second engagement feature;

wherein the first engagement feature of the uncurled portion of the curl spring engages the first connection member of the mounting bracket to attach the curl spring to the mounting bracket at a first location and the second engagement feature of the uncurled portion of the curl spring engages the second connection member of the mounting bracket to attach the curl spring to the mounting bracket at a second location;

wherein the second engagement feature comprises an aperture extending through the uncurled portion of the curl spring and defining an annular opening;

wherein the second connection member of the mounting bracket comprises a post having a peripheral outer wall disposed in the annular opening; and wherein, in an uninstalled, assembled configuration of the window balance assembly, the mounting bracket is retained with the carrier.

2. The window balance assembly of claim 1 wherein, in the uninstalled, assembled configuration of the window balance assembly, the curled portion of the curl spring bears against the arcuate surface of the carrier and the curl spring exerts a force against at least one of the first and second connection members of the mounting bracket to retain the mounting bracket against the first end of the carrier.

3. The window balance assembly of claim 2 wherein the body portion of the mounting bracket includes a first side and a second side, wherein the first side comprises a recess;

wherein the first connection member and the second connection member are located on the first side of the body portion;

wherein the uncurled portion of the curl spring is at least partially received in the recess.

4. The window balance assembly of claim 3 wherein the body portion of the mounting bracket comprises at least one aperture extending through the body portion of the mounting bracket.

5. The window balance assembly of claim 3, wherein the carrier further comprises a plurality of projections extending from the first end of the carrier; and wherein, in the uninstalled, assembled configuration of the window balance assembly, a lower end of the mounting bracket contacts an upper surface of at least one of the plurality of projections extending from the first end of the carrier.

6. The window balance assembly of claim 3 wherein the receiver further comprises a slotted recess, the slotted recess is configured to receive a pivot bar extending from a window sash such that the pivot bar is rotationally fixed relative to the receiver when the pivot bar is received in the slotted recess.

7. The window balance assembly of claim 1 wherein the carrier further comprises a depth measured along the first axis; and wherein rotation of the cam between the first position and the second position operates to increase or decrease an overall dimension of the depth of the carrier.

8. The window balance assembly of claim 7 wherein the mounting bracket includes a lower end comprising a first leg and a second leg each extending downward from the mounting bracket.

9. The window balance assembly of claim 8, wherein in the uninstalled configuration, the first leg and the second leg of the mounting bracket straddle a projection on the first end of the carrier.

10. The window balance assembly of claim 1, wherein in the uninstalled configuration, a surface at a lower end of the mounting bracket contacts a surface of a projection extending from the first end of the carrier.

11. The window balance assembly of claim 10, wherein the surface of the lower end of the mounting bracket comprises a first shape;

wherein the surface of the projection comprises a second shape; and wherein the first shape corresponds to the second shape.

12. The window balance assembly of claim 11, wherein the carrier includes a plurality of projections extending from the first end of the carrier.

* * * * *